United States Patent
Lim et al.

(10) Patent No.: US 12,075,154 B2
(45) Date of Patent: Aug. 27, 2024

(54) ELECTRONIC DEVICE, METHOD, AND NON-TRANSITORY STORAGE MEDIUM FOR PHOTOGRAPHING IMAGE

(71) Applicant: Samsung Electronics Co., Ltd., Gyeonggi-do (KR)

(72) Inventors: Yujin Lim, Gyeonggi-do (KR); Jaehan Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 17/574,861

(22) Filed: Jan. 13, 2022

(65) Prior Publication Data

US 2022/0224828 A1 Jul. 14, 2022

Related U.S. Application Data

(63) Continuation of application No. PCT/KR2022/000583, filed on Jan. 12, 2022.

(30) Foreign Application Priority Data

Jan. 13, 2021 (KR) ........................ 10-2021-0004770

(51) Int. Cl.
*H04N 23/60* (2023.01)
*G06F 3/16* (2006.01)
(Continued)

(52) U.S. Cl.
CPC ............. *H04N 23/64* (2023.01); *G06F 3/165* (2013.01); *H04N 23/632* (2023.01);
(Continued)

(58) Field of Classification Search
CPC .... H04N 23/64; H04N 23/632; H04N 23/633; H04N 23/69; H04N 23/00; H04N 23/60;
(Continued)

(56) References Cited

U.S. PATENT DOCUMENTS

| 10,236,016 B1 | 3/2019 | Li et al. |
| 2003/0151678 A1 | 8/2003 | Lee et al. |

(Continued)

FOREIGN PATENT DOCUMENTS

| EP | 1513345 A1 * | 3/2005 | ............... H04N 7/15 |
| JP | 2011-130134 A | 6/2011 | |

(Continued)

OTHER PUBLICATIONS

Wikitionary, Definition of "circuitry", Aug. 31, 2023, retrieved from https://en.wiktionary.org/wiki/circuitry on Jan. 13, 2024 (Year: 2023).*

(Continued)

*Primary Examiner* — Timothy J Henn
(74) *Attorney, Agent, or Firm* — Cha & Reiter, LLC

(57) ABSTRACT

An electronic device and method are disclosed. The electronic devices includes a camera, internal microphone, display, communication circuitry, and a processor. The processor implements the method, including: in response to receiving an image capturing request, controlling activate the internal microphone and the external microphone, displaying an image captured by at least one camera, obtaining audio information related to a sound, wherein the sound is input to the microphone and the at least one external microphone during capturing of the image, adjusting a sound level of each of the microphone and the at least one external microphone according to a sound balance between the microphone and the at least one external microphone, based on the audio information, and displaying information related to the adjustment of the sound level via the display.

20 Claims, 16 Drawing Sheets

(51) Int. Cl.
    *H04N 23/63*     (2023.01)
    *H04N 23/69*     (2023.01)
    *H04R 3/00*     (2006.01)

(52) U.S. Cl.
    CPC ........... *H04N 23/633* (2023.01); *H04N 23/69* (2023.01); *H04R 3/00* (2013.01)

(58) Field of Classification Search
    CPC ...... H04N 23/57; H04N 23/62; H04N 23/631; H04N 23/695; G06F 3/165; H04R 3/00; H04R 3/005; H04R 2420/07; H04R 2430/01; H04M 1/72415; H04S 7/40; H04S 2400/15
    See application file for complete search history.

(56) References Cited

U.S. PATENT DOCUMENTS

| | | |
|---|---|---|
| 2006/0023081 A1 | 2/2006 | Sekiguchi et al. |
| 2008/0246833 A1* | 10/2008 | Yasui .................... H04N 7/142 348/E7.083 |
| 2012/0237050 A1 | 9/2012 | Akasaka |
| 2013/0342730 A1 | 12/2013 | Lee et al. |
| 2015/0078724 A1 | 3/2015 | Jung |
| 2016/0080628 A1 | 3/2016 | Konicek |
| 2017/0019580 A1 | 1/2017 | Boghosian et al. |
| 2017/0154625 A1 | 6/2017 | Heo |
| 2017/0180649 A1 | 6/2017 | Kim et al. |
| 2019/0286413 A1 | 9/2019 | Hansson et al. |
| 2022/0321853 A1* | 10/2022 | Yoshikawa ............ H04N 9/802 |

FOREIGN PATENT DOCUMENTS

| | | |
|---|---|---|
| JP | 2012-209912 A | 10/2012 |
| JP | 2014-127737 A | 4/2014 |
| KR | 10-2003-0067979 A | 8/2003 |
| KR | 10-2014-0000585 A | 1/2014 |
| KR | 10-2014-0000586 A | 1/2014 |
| KR | 10-2014-0000587 A | 1/2014 |
| KR | 10-1439509 B1 | 9/2014 |
| KR | 10-2016-0116313 A | 10/2016 |

OTHER PUBLICATIONS

International Search Report dated Apr. 22, 2022.
European Search Report dated Mar. 19, 2024.

* cited by examiner

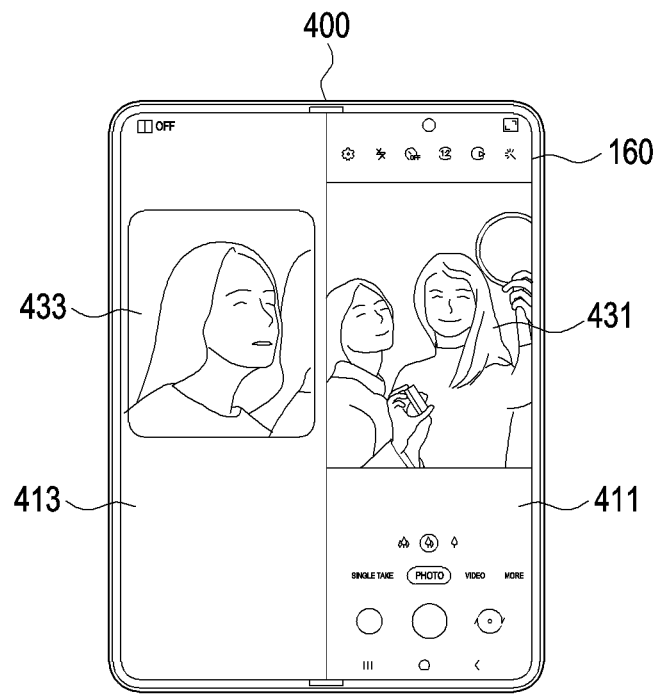
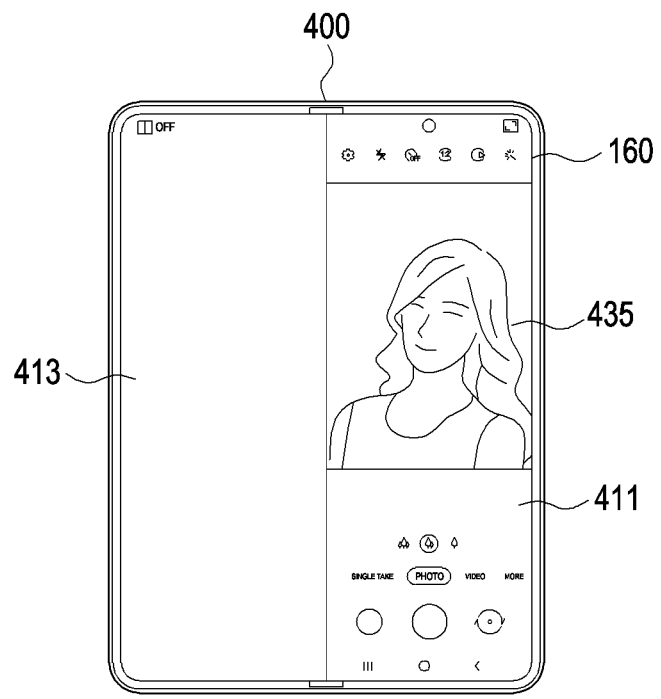
FIG.4B

ELECTRONIC DEVICE, METHOD, AND NON-TRANSITORY STORAGE MEDIUM FOR PHOTOGRAPHING IMAGE

CROSS-REFERENCE TO RELATED APPLICATION(S)

This application is a continuation application, claiming priority under § 365(c), of an International application No. PCT/KR2022/000583, filed on Jan. 12, 2022, which is based on and claims the benefit of a Korean patent application number 10-2021-0004770, filed on Jan. 13, 2021, in the Korean Intellectual Property Office, the disclosure of each of which is incorporated by reference herein in its entirety.

BACKGROUND

Technical Field

Certain embodiments of the disclosure relate to an electronic device for capturing images, a method therefor, and a non-transitory storage medium therefor.

Description of Related Art

The services and functions provided by electronic devices have expanded greatly in recent times. a variety of applications executable by electronic devices have been developed to improve utility of the electronic devices and to satisfy consumer demand. Such applications include camera applications for capturing images (for example, still or moving images), using cameras installed in the electronic devices.

The user of an electronic device may use the camera application to capture images, and various additional functions may be provided during image capture. The electronic device may receive audio information through a microphone during image capture. By capturing images including audio information through the camera and microphone provided in the electronic device, the multimedia capture may enable execute of further functions such as video conferencing, video communication, and video recording and editing.

SUMMARY

An electronic device may configure various recording settings/conditions for the camera through the camera application. Furthermore, sounds may be captured during the image capture using either an internal microphone of the electronic device, or an external microphone communicatively connected to the device through wired (e.g., a wired microphone) or wireless (e.g., Bluetooth microphones) connections.

Typically, when an external microphone is connected to the electronic device, sound recording is executed solely by the external microphone. Accordingly, other noises for which the internal microphone may be more sensitive, such as ambient and peripheral noises, may not be recorded.

An electronic device, a method, and a non-transitory storage medium according to certain embodiments of the disclosure may acquire audio information using both an internal microphone of the electronic device and an external microphone during image capture.

According to an embodiment of the disclosure, an electronic device may include: a camera module including at least one camera, an internal microphone, a display, a communication circuitry, a memory, and at least one processor electrically connected to the camera module, the internal microphone, the display the communication circuitry and the memory. The processor is configured to: in response to receiving an image capturing request, activate the internal microphone and at least one external microphone via the communication circuitry, control the display to display an image captured by via at least one camera, obtain audio information related to a sound, wherein the sound is input to the microphone and the at least one external microphone during capturing of the image, adjust recording levels of the internal microphone, and the at least one external microphone, based on the received audio information, and control the display to display information related to the adjusted recording levels.

According to an embodiment of the disclosure, an operation method in an electronic device may include: in response to receiving an image capturing request, controlling to activate a microphone of the electronic device and at least one external microphone connected via communication circuitry of the electronic device, displaying, via a display of the electronic device, an image captured by at least one camera of the electronic device, obtaining audio information related to a sound, wherein the sound is input to the microphone and the at least one external microphone during capturing of the image, adjusting a sound level of each of the microphone and the at least one external microphone according to a sound balance between the microphone and the at least one external microphone, based on the audio information, and displaying information related to the adjustment of the sound level via the display.

According to an embodiment of the disclosure, non-transitory computer-readable medium is disclosed, the medium storing a program including executable instructions which are executable by a processor of an electronic device to cause the electronic device to: in response to receiving an image capturing request, control to activate a microphone of the electronic device and at least one external microphone connected via wireless communication circuitry of the electronic device, displaying, via a display of the electronic device, an image captured by at least one camera of the electronic device, obtain audio information related to a sound, wherein the sound is input to the microphone and the at least one external microphone during capturing of the image, adjust a sound level of each of the microphone and the at least one external microphone according to a sound balance between the microphone and the at least one external microphone, based on the audio information, and display information related to the adjustment of the sound level via the display.

Certain embodiments of the disclosure may provide an electronic device, a method, and a storage medium, in which audio information is acquired using both an internal microphone of the electronic device and an external microphone during image capture, thereby increasing the diversity of recorded sounds.

According to certain embodiments, an electronic device may automatically activate one or more camera according to sounds detected during image capture, thereby capturing images of a subject identified in the direction or area indicated by the incident sound, and may adjust the respective sound levels of the internal microphone and the external microphone, to achieve a better balance of sound between the two recording sources. The electronic device may provide a user interface capable of controlling image capture and sound levels, according to sounds detected by the internal and external microphones, thereby facilitating image capture control, in which the user may conveniently adjust the recording levels as desired during recording.

Various other advantageous effects identified explicitly or implicitly through the disclosure may be provided.

BRIEF DESCRIPTION OF THE DRAWINGS

FIG. 4B illustrates examples of execution screens of a camera application according to a configuration of an electronic device according to another embodiment.

In relation to the description of drawings, the same or similar reference numerals may be used for the same or similar components.

DETAILED DESCRIPTION

Hereinafter, an electronic device according to certain embodiments will be described with reference to the accompanying drawings. The term "user" used in certain embodiments may refer to a person who uses an electronic device or a device (for example, an artificial intelligence electronic device) using the electronic device.

Figure 1:
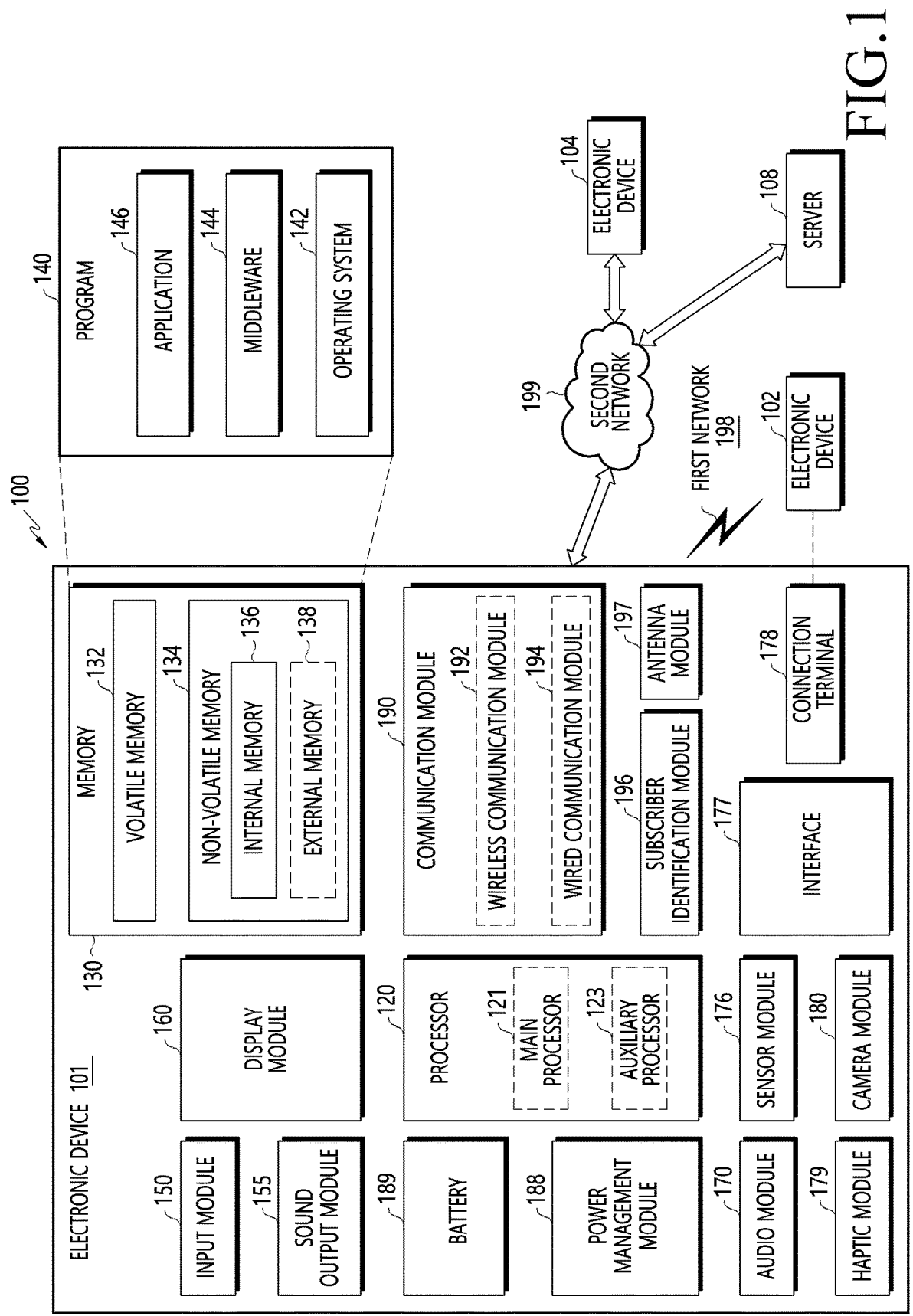
FIG. 1 is a block diagram of an electronic device in a network environment according to certain embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1 eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
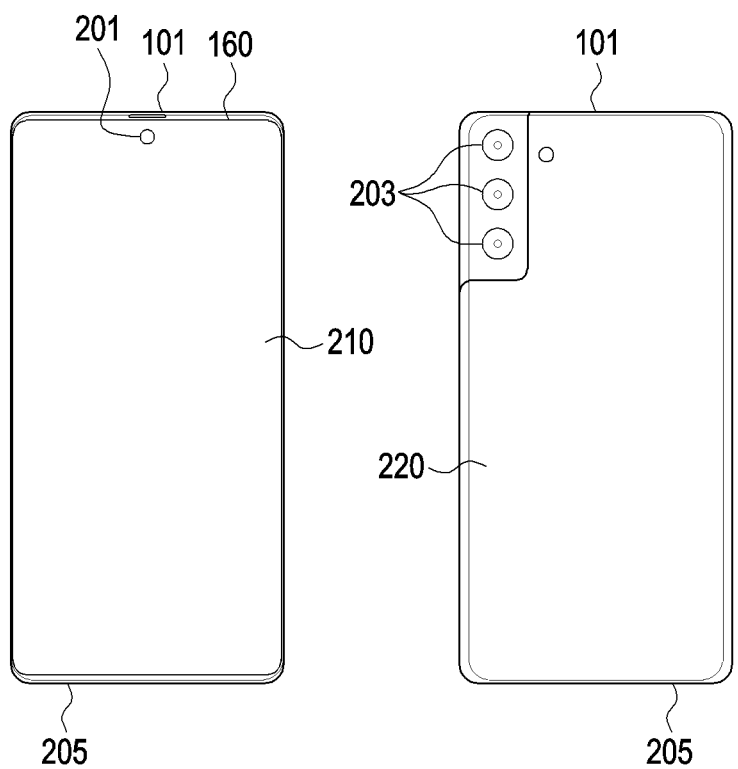
FIG. 2 illustrates an example of a configuration of an electronic device according to an embodiment.
Figure 3A:
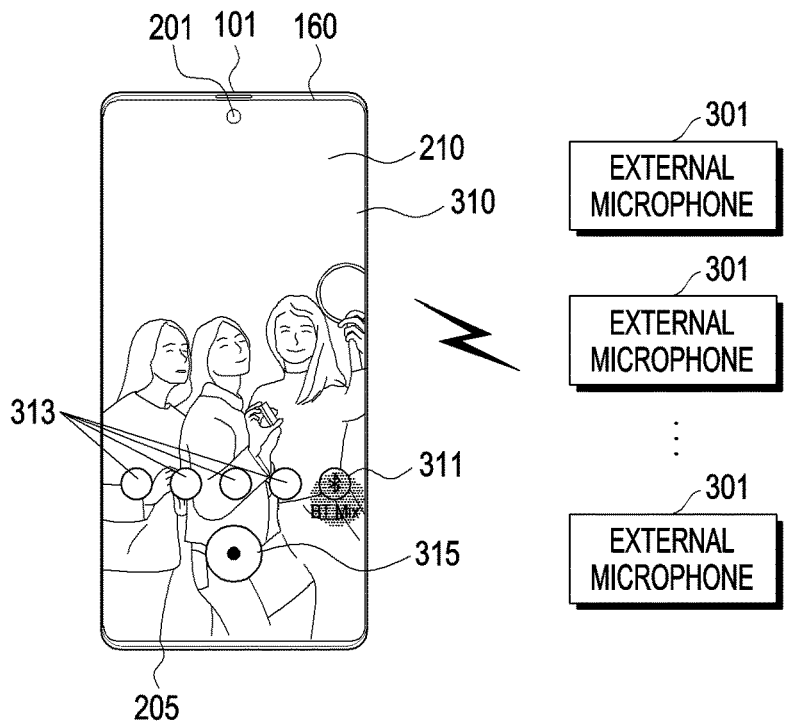
FIGS. 3A, 3B, and 3C illustrate an example of a screen in an electronic device according to an embodiment.
Figure 3B:
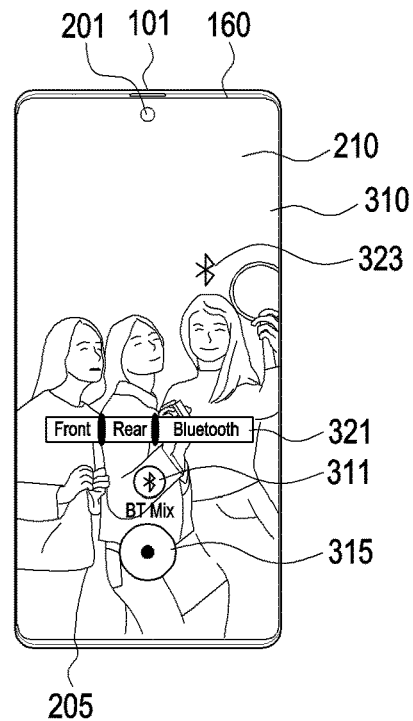
Figure 3C:
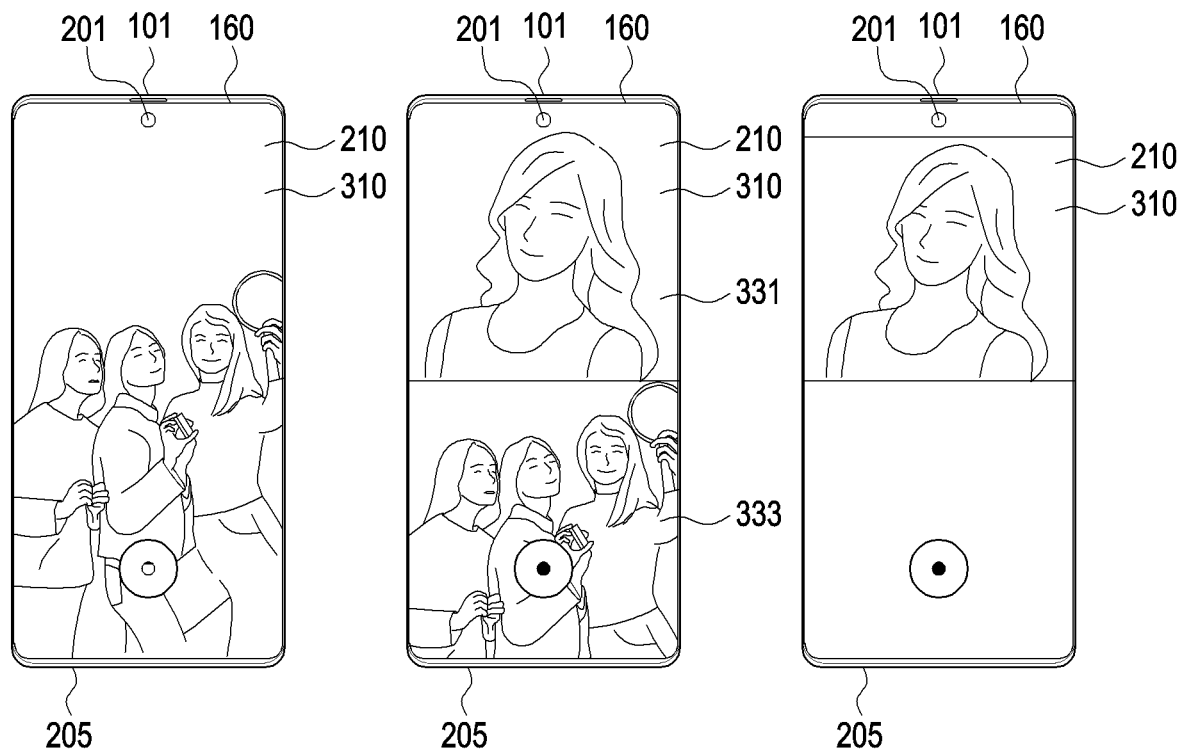

FIG. 2 illustrates an example of a configuration of an electronic device according to an embodiment, and FIGS. 3A, 3B, and 3C illustrate an example of a screen in an electronic device according to an embodiment.

Referring to FIGS. 1, 2, 3A, 3B, and 3C, the electronic device 101 according to an embodiment may be configured such that the display module 160 is disposed to expose a display panel on a first surface (e.g., a front surface) 210 of a housing, and cameras (e.g., a front camera 201 and a rear camera 203) included in a camera module 180 are disposed in a part of the first surface and a part of a second surface (e.g., a rear surface) 220 of the housing, respectively. The electronic device 101 may be configured such that a microphone 205 is disposed on a third surface (e.g., a lower end side surface relative to an x-axis) of the housing. The processor 120 according to an embodiment may be electrically connected to the memory 130, the display module 150, the camera module 180, and the microphone 205.

When a camera application (e.g., a program or a function) for capturing an image is executed, the processor 120 of the electronic device 101 according to an embodiment may control the camera module 180 to be driven. For example, when an input by an execution icon (e.g., an object, a graphic element, a menu, a button, or a shortcut image) (not shown) indicating a camera application displayed on a home screen (not shown) of the display module 160, an input by a designated button, or an input by a designated gesture is received, the processor 120 may identify that there is an image capturing request, and execute the camera application.

The processor 120 of the electronic device 101 according to an embodiment may control the camera module 180 including at least one camera to activate the at least one camera according to the execution of the camera application to perform image capturing, and control the display module 160 to display an image capturing screen 310. The processor 120 may activate the microphone 205 to receive a sound which is generated by a user, by a subject, or around the subject, during image capturing. The processor 120 may control the communication module 190 to connect with at least one external microphone 301 (e.g., a Bluetooth (BT) microphone) via wireless communication. The wireless communication may be communication using a Bluetooth (BT) communication scheme.

As shown in FIG. 3A, the processor 120 according to an embodiment may control the display module 160 to display, on the image capturing screen 310, objects 311 and 313 (e.g., an option, a menu, a graphic element, a function, or a shortcut icon) for configuring a microphone for usage during image capturing. For example, the image capturing screen 310 may be an execution screen displayed on the display module 160, and may display a captured image (e.g., a recorded image or an image output as successive low-resolution image frames before image recording). The object 311 may (e.g., Bluetooth or "BT" mix) for configuring both the microphone 205 and the at least one external microphone 301 to be used during image capturing. The objects 313 are objects for configuring the microphone 205 and the at least one external microphone 301 to be used separately and respectively, and may be, for example, objects for configuring the microphone 205 as an omnidirectional (omni) microphone, as a directional (front and rear) microphone, for configuring a USB-connected microphone, or for configuring an external microphone connected by wireless communication (e.g., BT). For example, the objects 311 and 313 may be displayed on an image recording screen for recording a captured image or an editing screen in addition to the image capturing screen 310.

As shown in FIG. 3A, when the object 311 (e.g., BT mix) displayed on the image capturing screen 310 is selected, the processor 120 according to an embodiment may activate the microphone 205 and the at least one external microphone 301. When a record button 315 displayed on the image capturing screen 310 is selected, the processor 120 may record a captured image, and store, in the memory 130, audio information received from the microphone 205 and the at least one external microphone 301 during image capturing together. In this case, the recorded image may be a moving image of successive image frames.

As shown in FIG. 3A, when the object 311 is selected, the processor 120 according to an embodiment may activate the microphone 205 and the at least one external microphone 301 such that both the microphone 205 and the at least one external microphone 301 are used during image capturing. The microphone 205 and the at least one external microphone 301 may receive sound generated from at least one subject and ambient to the subject according to sound levels (or sensitivity) specified during image capturing or previously set. The sound level may indicate a characteristic in which a microphone converts a sound having the same size into an electrical signal, and may indicate the reception sensitivity of the microphone.

The processor 120 according to an embodiment may obtain audio information corresponding to the sound input to the activated microphone 205 and at least one external microphone 301 during image capturing. The processor 120 may identify at least one microphone to which a sound is input, among the activated microphone 205 and the at least one external microphone 301, based on the audio information, and identify at least one subject corresponding to the identified microphone in a captured image. As shown in FIG. 3B, the processor 120 may display an object 323 indicating the identified at least one microphone so as to be superimposed on or disposed adjacent to the at least one subject.

The processor 120 according to an embodiment may adjust a sound level (or sensitivity) of each of the microphone 205 and the at least one external microphone 301, based on the relative balance between the microphone 205 and the at least one external microphone 301 while capturing the image. As shown in FIG. 3B, the processor 120 may control the display module 160 to display an object 321 (e.g., a graphic element, a function, or an indicator) for adjusting a sound level of the identified at least one microphone on the image capturing screen 310. For example, the object 321 may be displayed on the image capturing screen 310 so as to be superimposed on or disposed adjacent to an area in which a captured image is displayed, and may be a bar-shaped user interface. For example, the processor 120 may automatically adjust the sound level of each of the microphone 205 and the at least one external microphone 301, and reflect the adjusted result on the object 321 based on the relative sizes of the indicators included within the object 321. For example, the processor 120 may adjust the sound levels of each of the microphone 205 and the at least one external microphone based on user inputs to the object 321. Alternatively, when a plurality of subjects are included in the image, the processor 120 may identify a subject set to have high importance among the plurality of subjects, and configure a sound level of an external microphone corresponding to the identified subject from among a plurality of external microphones 301 to be increased higher than a recording level of the microphone 205 of the electronic device 101.

The processor 120 according to an embodiment may control the display module 160 to display a captured image on the image capturing screen 310, as shown in FIG. 3C, and may identify a direction in which a sound is generated, based on audio information obtained during image capturing. When the identified direction is identified as a direction towards which the first surface 210 faces, the processor 120 may activate the front camera 201 based on resonance to the front face of the device thereof. As shown in FIG. 3C, when the front camera 201 is activated, the processor 120 may control the display module 160 to divide the image capturing screen 310 to display an image (or preview image) captured by the front camera 201 in a first divided area 331, and display an image (or preview image) captured by the rear camera 203 in a second divided area 333. When the front camera 201 is activated and the rear camera 203 is deactivated, the processor 120 may control the display module 160 to display the image (or preview image) captured by the front camera 201 in the first area 331 of the image capturing screen 310 divided as shown in FIG. 3C, without removing the screen division. When the preview image displayed in the first area 331 is selected, the processor 120 may control the display module 160 to display the image (or preview image) captured by the front camera 201 over an entire undivided area, or alternative within the first divided area 331 of the image capturing screen 310.

When a direction in which a sound is generated is identified as a direction in which the second surface 220 faces, the processor 120 according to an embodiment may control a second camera 203 to adjust an angle of view and a zoom magnification. The processor 120 may control the display module 160 such that preview images captured by the rear camera 203 at different angles of view and zoom magnifications are displayed to be superimposed on or to be adjacent to the image displayed on the image capturing screen 310. The processor 120 may control the display module 160 to further display the preview image captured by the front camera 201 on the image capturing screen 310. When one of the displayed preview images is selected, the processor 120 may control the display module 160 such that the current image displayed on the image capturing screen 310 is switched to the selected preview image and displayed.

For example, the preview images displayed on the image capturing screen 310 may be displayed in at least one image form of a split view, a thumbnail, or a picture-in-picture (PIP), and in the case of a plurality of preview images, depending on the loudness of a sound, the order of the images may be changed in real time, newly added, or partially deleted, and the images may be arranged and displayed in an order of higher to lower sound loudness.

Even when both the microphone 205 and the at least one external microphone 301 may be configured to be activated, since the connection of the at least one external microphone 301 may be released or the strength of a received signal may be low below a specified threshold value depending on a wireless communication state, the processor 120 according to an embodiment may temporarily not receive audio information from the at least one external microphone 301. The processor 120 may identify a microphone which is disconnected or has a low received signal strength among the activated microphone 205 and at least one external microphone 301, based on the obtained audio information, and control the display module 160 to display, on the image capturing screen 310, guidance information for informing of disconnection or a low received signal strength with respect to the identified microphone.

When at least two directions in which a sound is generated are identified based on the audio information, the processor 120 according to an embodiment may identify directional directions, based on the audio information of the microphone 205 in correspondence with the identified two or more directions, and adjust the sound level of each of the microphone 205 and the at least one external microphone 301, based on the identified directional directions and the sound balance between the at least one external microphone 301.

As such, in certain embodiments, main components of the electronic device 101 of FIGS. 1 and 2 have been described via the electronic device 101. However, in certain embodiments, the components shown in FIGS. 1 and 2 are not all essential components, and the electronic device 101 may be implemented by more components than the illustrated components, or the electronic device 101 may be implemented by fewer components than the illustrated components. In addition, positions of the main components of the electronic device 101 described above with reference to FIGS. 1 and 2 can be changed according to certain embodiments.

Figure 4A:
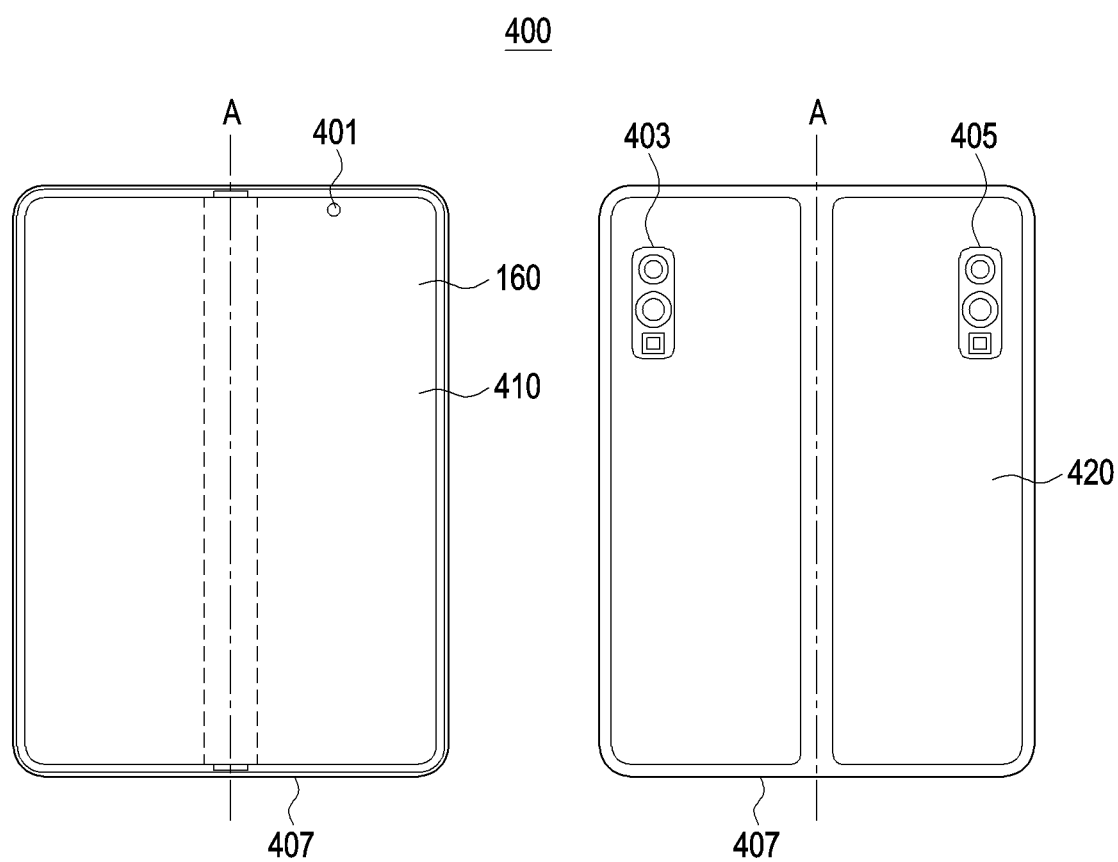
FIG. 4A illustrates an example of a configuration of an electronic device according to another embodiment.

FIG. 4A illustrates an example of a configuration of an electronic device according to another embodiment, and FIG. 4B illustrates examples of execution screens of a camera application according to a configuration of an electronic device according to another embodiment.

Referring to FIGS. 1, 4A, and 4B, an electronic device 400 according to another embodiment has a foldable shape, and may be configured such that the display module 160 can be folded with reference to a vertical axis A (e.g., a y-axis). The electronic device may be configured such that the display module 160 in the form of a flexible display is disposed to expose a display panel on a first surface (e.g., a front surface) 410 of a housing, a front camera (e.g., a front camera 401) included in the camera module 180 is disposed on a part of the first surface 410, and rear cameras (e.g., a first rear camera 403 and a second rear camera 405) are respectively arranged in a part of divided areas of a second surface (a rear surface) 420 divided according to the folding of the display module 160. The electronic device 400 may be configured such that the microphone 205 is disposed on a third surface (e.g., a lower end side surface relative to an x-axis) of the housing. The processor 120 according to an embodiment may be electrically connected to the memory 130, the display module 150, the camera module 180, and a microphone 407. As the second rear camera 405 is further configured, the processor 120 of the electronic device 400 according to another embodiment may discriminately identify a direction in which a sound is generated in a captured image, according to, for example, a left and a right direction with reference to A (e.g., an y-axis). As shown in FIG. 4B, the processor 120 may control the display module 160 to display images 431 and 433 obtained by the first rear camera 403 and the second rear camera 405, respectively, in divided areas 411 and 413 of the display module 160, respectively. As shown in FIG. 4B, the processor 120 may control the display module 160 to display an image 435 obtained by the front camera 401 in the divided area 411 of the display module 160. The processor 120 according to another embodiment may further configure a camera to obtain a preview image in three or more directions, and as described in an embodiment, the processor 120 may adjust a sound level of each of the microphone 407 and the at least one external microphone 301, based on the sound balance between the microphone 407 and the at least one external microphone 301, based on audio information.

The electronic device 400 according to the embodiment described with reference to FIGS. 1, 4A, and 4B is not limited to the foldable form, and may be configured in other foldable forms, rollable forms, or other various forms.

According to an embodiment, an electronic device (e.g., the electronic device 101 of FIGS. 1 and 2) may include a camera module including at least one cameras, a microphone, a display, a communication circuitry, a memory, and at least one processor electrically connected to the camera module, the microphone, the display, the communication circuitry, and the memory, in which the at least one processor is configured to, in response to receiving an image capturing request, control to activate the microphone and at least one external microphone connected via the communication circuitry, control the display to display an image captured by the at least one camera, obtain audio information related to a sound, wherein the sound is input to the microphone and the at least one external microphone during capturing of the image, adjust a sound level of each of the microphone and the at least one external microphone according to a sound balance between the microphone and the at least one external microphone, based on the audio information, and control the display module to display information related to the adjustment of the sound level.

According to an embodiment, the communication circuitry is configured to connect at least one external microphone using a Bluetooth communication. According to an embodiment, the at least one processor may be configured to identify at least one of a direction or a distance in which the sound is generated, based on the audio information, set an area for image capture, based on at least one of the direction or the distance in which the sound is generated, adjust at least one of an angle of view or a zoom magnification of the at least one camera based on the set area, and control the display module to display an image captured by the at least one camera based on at least one of the adjusted angle of view or the adjusted zoom magnification on an image capturing screen.

According to an embodiment, the at least one processor may be configured to identify at least one of a direction or a distance in which the sound is generated, based on the audio information, set an area for image capture, based on at least one of the direction or the distance in which the sound is generated, obtain a plurality of preview images captured by at least one camera based on different angles of view and zoom magnifications for the camera module in the set area, control the display to display the plurality of preview images on the display either superimposed upon adjacent to the captured image, and when one of the plurality of preview images is selected, control the display to the selected one of the plurality of preview images.

According to an embodiment, the at least one processor may be configured to, when the sound is identified as originating from a direction in which a first surface of a housing of the electronic device faces, based on the audio information, obtain a first preview image captured by a first camera disposed on the first surface, and when the sound is identified as originating from a direction in which a second surface of the housing faces, based on the audio information, obtain a second preview image captured by a second camera disposed on the second surface.

According to an embodiment, the at least one processor may be configured such that the second preview image is captured by adjusting an angle of view and a zoom magnification of the second camera, and wherein the first preview image and the second preview image are displayed on an image capturing screen in an order of higher to lower sound level.

According to an embodiment, the at least one processor may be configured to identify at least one subject related to the sound in the captured image, based on the audio information, identify that the at least one external microphone corresponds to the identified at least one subject, control the display to display an object representing the identified at least one external microphone on an image capturing screen in which the captured image is displayed, and control the display to display an object for adjusting sound levels of the microphone and the at least one external microphone on the image capturing screen.

According to an embodiment, the at least one processor may be configured to, when the sound is identified from the direction in which the first surface of the housing of the electronic device faces, based on the audio information, adjust a sound level of the microphone to be higher than a sound level of the at least one external microphone, and when the sound is identified from the direction in which the second surface of the housing of the electronic device faces, based on the audio information, adjust the sound level of the at least one external microphone to be higher than the sound level of the microphone.

According to an embodiment, the at least one processor may be configured to control the display module to display, on the image capturing screen displaying the captured image, an object for adjusting a sound level, the object indicating the at least one external microphone and directional directions of the microphone, identify a directional direction of the microphone in which the sound is generated, based on the audio information, and adjust a sound level in the identified directional direction of the microphone to a high value by using the object.

According to an embodiment, the at least one processor may be configured to, when a plurality of subjects are included in the image, identify a subject set to have high importance among the plurality of subjects, and adjust a sound level of an external microphone corresponding to the identified subject among the at least one external microphone to be higher than compared to the sound level of the microphone.

Figure 5:
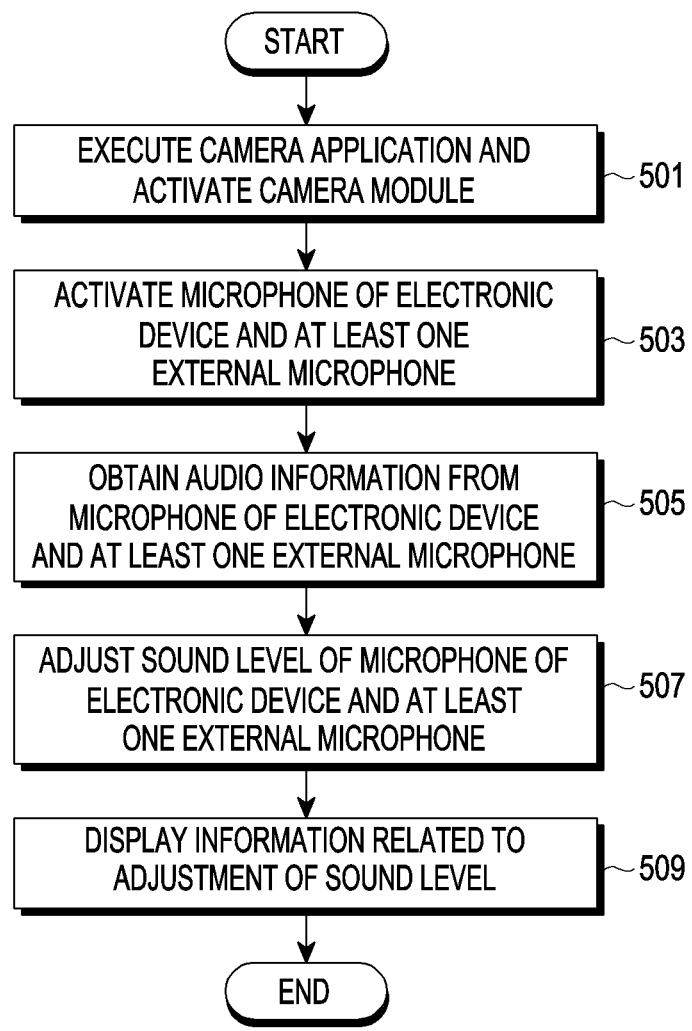
FIG. 5 illustrates an example of an operation method in an electronic device according to an embodiment.
Figure 6:
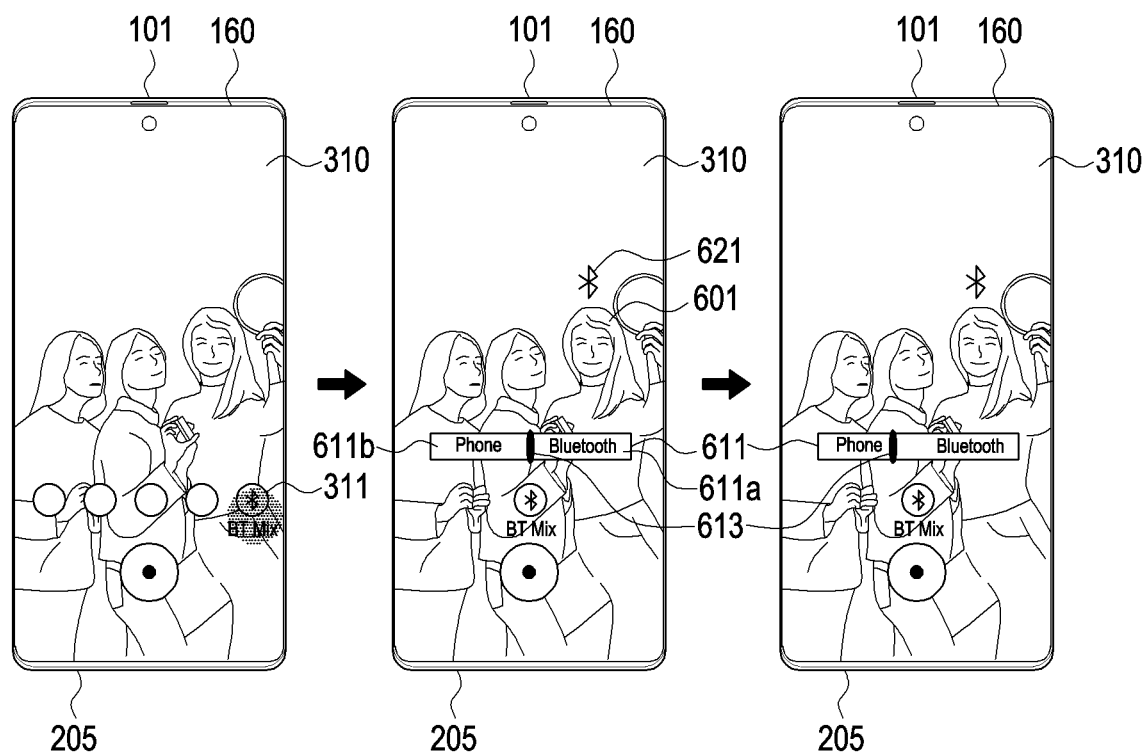
FIG. 6 illustrates an example of a screen of an operation method in an electronic device according to an embodiment.

FIG. 5 illustrates an example of an operation method in an electronic device according to an embodiment, and FIG. 6 illustrates an example of a screen of an operation method in an electronic device according to an embodiment.

Referring to FIGS. 5 and 6, in operation 501, the electronic device 101 (e.g., the electronic device 101 of FIGS. 1 and 2) according to an embodiment may execute a camera application (e.g., a program or function) for capturing an image, and activate a camera module (e.g., the camera module 180 of FIG. 1) according to the execution of the camera application. For example, when an input by an execution icon (e.g., an object, a graphic element, a menu, a button, or a shortcut image) (not shown) indicating an application for capturing an image, which is displayed on a home screen (not shown) of the display module 160 (e.g., the display module 160 of FIG. 1), an input by a designated physical button, or an input by a designated gesture is received, the electronic device 101 may identify input of an image capturing request, and execute the camera application.

In operation 503, the electronic device 101 may activate, in response to the image capturing request, a microphone (e.g., the microphone 205 of FIG. 2) of the electronic device and at least one external microphone (e.g., the Bluetooth (BT) microphone 301 of FIG. 3) connected via wireless communication, so as to receive audio information corresponding to a sound which is generated by a user, by a subject, or ambient to the subject during image capturing via a camera (e.g., the rear camera 203 of FIG. 2) included in the camera module. For example, the electronic device 101 may display, on the image capturing screen 310 of the camera application, an object (e.g., the object 311 (BT mix) of FIG. 3) for configuring both the microphone and the at least one external microphone to be used, before image recording or during image capturing. As shown in FIG. 6, when the object 311 (e.g., the object 311 (BT mix) of FIG. 3A) displayed on the image capturing screen 310 is selected, the electronic device 101 may activate both the microphone 205 (e.g., the microphone 205 of FIG. 2) of the electronic device 101 and the at least one external microphone (e.g., the Bluetooth (BT) microphone 301 of FIG. 3) connected via wireless communication. As shown in FIG. 6, the electronic device 101 may display a captured image on the image capturing screen 310. As shown in FIG. 6, when audio information is obtained, the electronic device 101 may display an object (or graphic element) 611 for adjusting a sound level of each of the microphone 205 and the at least one external microphone on the image capturing screen 310. For example, as shown in FIG. 6, the object 611 may be displayed in the form of a bar for adjusting a sound level by a user interface, and may be divided into a first portion 611a indicating the activated microphone 205 of the electronic device and a second portion 611b indicating the activated external microphone and displayed. As the relative sound balance between the activated microphone 205 of the electronic device and the activated external microphone is configured to be a specified percentage (e.g., 50%) for each of the activated microphones, a line 613 for adjusting a sound level of the first portion 611a and the second portion 611b of the object 611 for adjustment of a sound level may be displayed at a middle point. For example, when image capturing is started, the electronic device 101 may capture an image by a previously configured camera or capture an image by a camera selected by a user when the camera application is executed. The electronic device 101 may activate another camera, based on audio information obtained during image capturing, to capture an image captured via the other camera together, or capture an image by switching to an image captured via the other camera.

In operation 505, the electronic device 101 may obtain audio information related to a sound input to the microphone and the at least one external microphone while capturing an image via at least one activated camera. The electronic device 101 may identify the microphone and at least one external microphone to which the sound is input, based on the audio information. For example, the electronic device 101 may identify which microphone received sound, based on identification information included within the audio information. The electronic device 101 may identify at least one subject related to the sound, based on stored information related to the at least one external microphone. For example, as shown in FIG. 6, the electronic device 101 may display a visual object 621 indicating the identified external microphone (e.g., a first external microphone) so as to be adjacent to an area in which the identified subject 601 (e.g., the first subject) is displayed.

In operation 507, the electronic device 101 may adjust a sound level of each of the microphone and the at least one external microphone to adjust a sound balance between the microphone and the at least one external microphone, based on the audio information. For example, the electronic device 101 may increase the sound level of at least one microphone, and reduce the sound level of other activated microphones. For example, when a user manually adjusts the line 613 of the object 611 for adjustment of the sound level, the electronic device 101 may adjust a sound level of each of the activated microphones in response to the adjustment of the line 613. Thus, in FIG. 6, the internal microphone is reduced in sound level, whereas the Bluetooth microphone is increased in sound level. For another example, the electronic device 101 may automatically adjust the sound level of each of the activated microphones without a user input, as described in some other embodiments.

In operation 509, the electronic device 101 may control the display module 160 to display information related to the adjustment of the sound level. The electronic device 101 may display, on the image capturing screen, information indicating the relative sound balance between the microphone and the at least one external microphone, the sound balance being changed according to the adjustment of the sound level of each of the microphone and the at least one external microphone, as the information related to the adjustment of the sound level. For example, when a sound level of an external microphone (a first BT microphone) related to the identified first subject 601 is increased, as shown in FIG. 6, the electronic device 101 may visually indicate the same through movement of the line 613 of the object 611 is moved in a leftwards (e.g., -x-axis) direction, and adjusted to a ratio in which the sound balance of the second portion 611*b*(e.g., phone) is relatively higher than that sound balance of the first portion 611*a* (e.g., bluetooth) (e.g., representing a sound mix in which the Bluetooth microphone is input at higher sensitivity than the internal phone microphone, with the equalizer ratio represented visually by the indicator).

Figure 7:
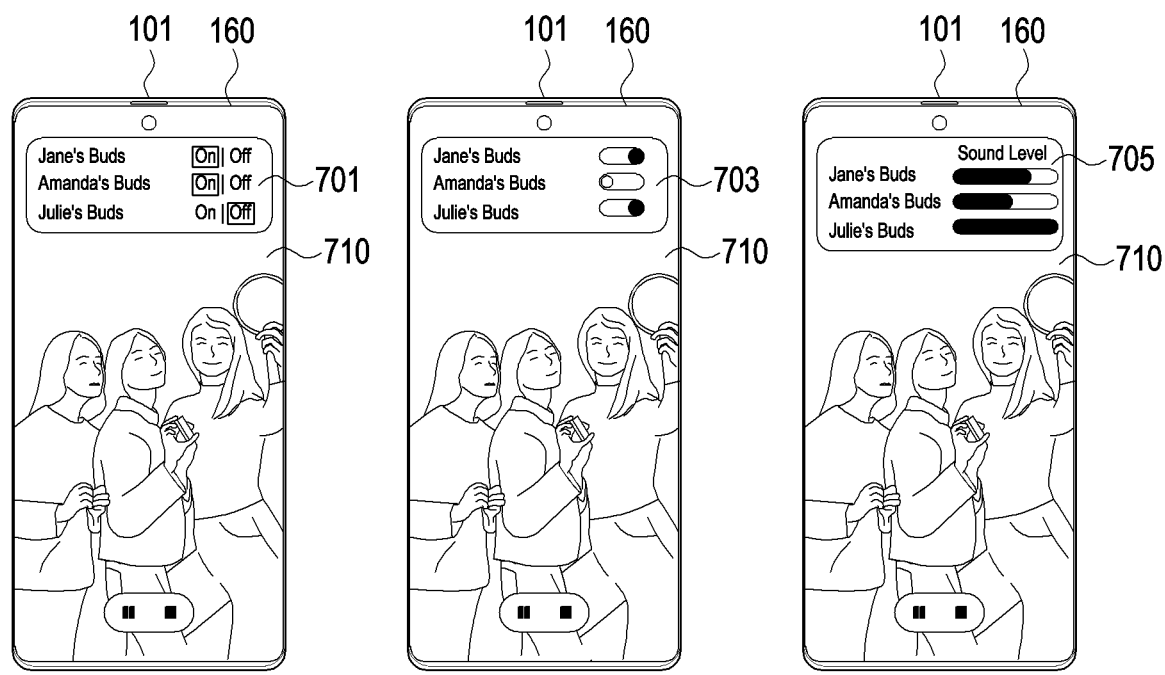
FIG. 7 illustrates an example of a screen of an operation method in an electronic device according to an embodiment.

FIG. 7 illustrates an example of a screen of an operation method in an electronic device according to an embodiment.

Referring to FIG. 7, the electronic device 101 (e.g., the electronic device 101 of FIGS. 1 and 2) according to an embodiment may search for at least one external microphone which is located in a surrounding area and can be connected by wireless communication. In a case where a plurality of external microphones (e.g., Jane's microphone (buds), Amanda's microphone (buds), and Julie's microphone (buds)) are searched, as shown in FIG. 7, the electronic device 101 may display information 701 including objects selectable to attempt connection to each of the identified external microphones and identification information of each of the external microphones on an image capturing screen 710 (e.g., the image capturing screen 310 of FIG. 3). As shown in FIG. 7, the electronic device 101 may display information 703 including an object capable of configuring whether to record a sound input from each of the external microphones and identification information of each external microphone on the image capturing screen 710. As shown in FIG. 7, the electronic device 101 may display information 705 including an object for adjusting a sound level of each of the external microphones and identification information of each of the external microphones on the image capturing screen 710. For example, when one external microphone is connected, the electronic device 101 may not display separate information related to the microphone.

Figure 8:
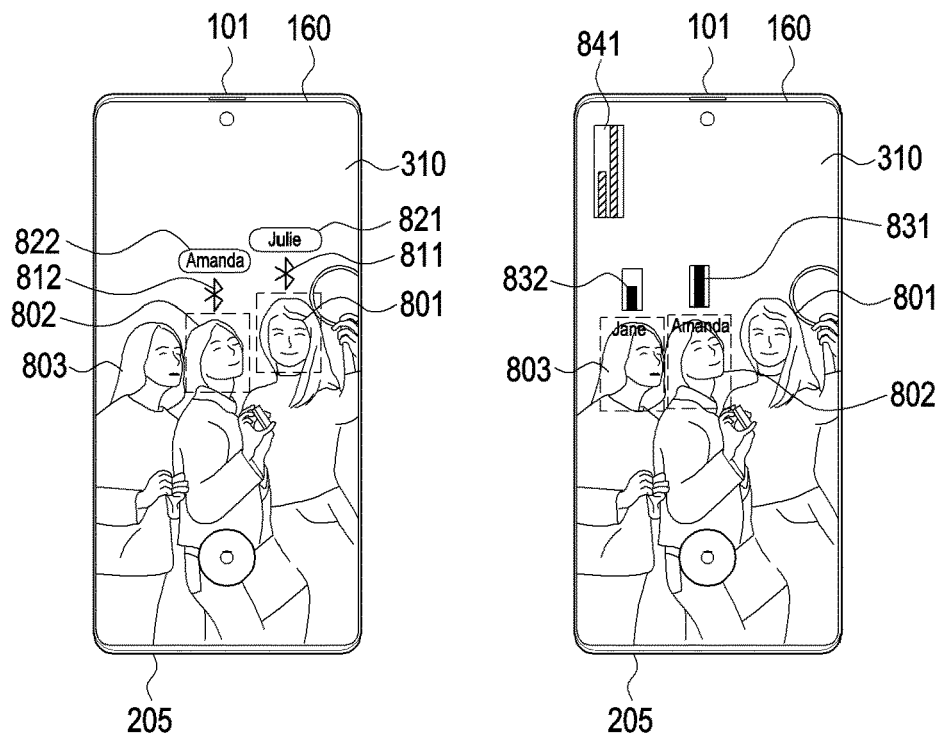
FIG. 8 illustrates an example of a screen of an operation method in an electronic device according to an embodiment.

FIG. 8 illustrates an example of a screen of an operation method in an electronic device according to an embodiment.

Referring to FIG. 8, at the time of performing operation 503 of FIG. 5, the electronic device 101 (e.g., the electronic device 101 of FIGS. 1 and 2) according to an embodiment may identify a connected external microphone among multiple connectable external microphones, based on audio information obtained during image capturing. For example, when two external microphones (e.g., Julie's microphone and Amanda's microphone) are identified, the electronic device 101 may identify two subjects (e.g., a first subject 801 "Julie" and a second subject 802 "Amanda") corresponding to the two identified external microphones. For example, the electronic device 101 may analyze face areas detected in a captured image to search for information similar to or corresponding to the analyzed result information (e.g., via facial recognition technology), and determine prestored identification information (e.g., a name or nickname) of subjects 801, 802, and 803, based on the searched information. The electronic device 101 compares the identified identification information with identification information (e.g., Julie and Amanda) of the two external microphones identified on the image capturing screen 310, so that the electronic device may identify two subjects 801 and 802 corresponding to the two identified external microphones, respectively, and display objects 811 and 812 (e.g., graphic elements or symbols) representing the external microphones and subject identification information 821 and 822 (e.g., "Julie" and "Amanda") so as to be superimposed on or disposed adjacent to areas in which the identified subjects 801 and 802 are displayed, respectively.

Referring to FIG. 8, at the time of performing operation 503 of FIG. 5, the electronic device 101 according to an embodiment may search for external microphones and identify two connected external microphones (e.g., Amanda's microphone and Jane's microphone) from among the searched microphones. The electronic device 101 compares identification information obtained by analyzing face areas detected in a captured image with the two external microphones (e.g., Amanda's microphone and Jane's microphone), so that the electronic device may identify two subjects 802 and 803 corresponding to the identified two external microphones, respectively, and display objects (e.g., bars, visual indicators, or graphic elements) 831 and 832 representing whether a connection is established or the degree (or magnitude) of a sound level so as to be superimposed on or to be adjacent to areas in which the identified respective subjects 802 and 803 are displayed. The electronic device 101 may display, on the image capturing screen 310, an object 841 representing sounds (sound levels of L and R) heard when an image is reproduced after recording is finished by adding up audio information received from the microphone 205 and/or the external microphone related to each of the subjects 802 and 803.

Figure 9:
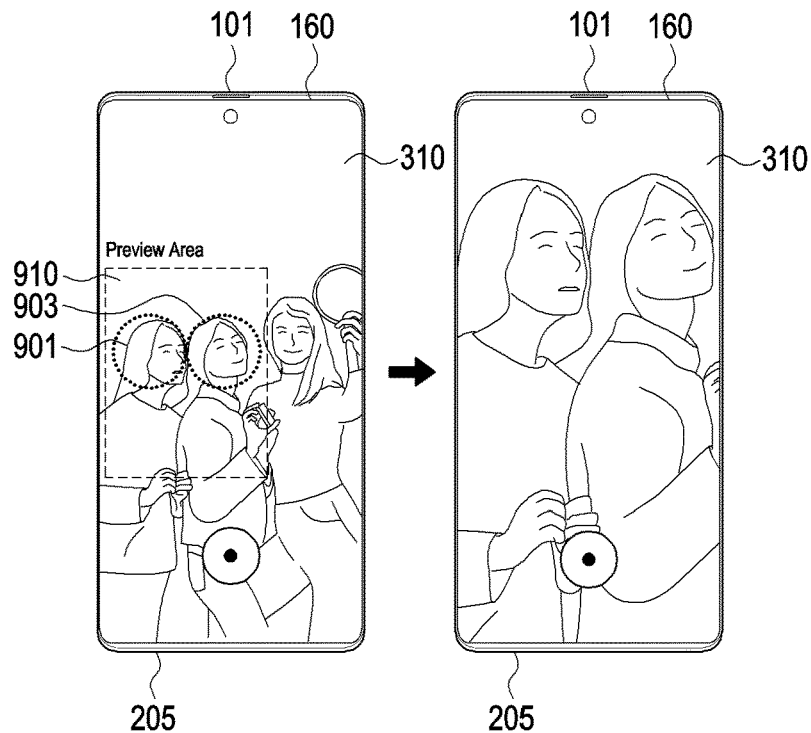
FIG. 9 illustrates an example of a screen of an operation method in an electronic device according to an embodiment.

FIG. 9 illustrates an example of a screen of an operation method in an electronic device according to an embodiment.

Referring to FIG. 9, at the time of performing operation 505 of FIG. 5, as shown in FIG. 9, the electronic device 101 (e.g., the electronic device 101 of FIGS. 1 and 2) according to an embodiment may identify at least one of a direction or a distance in which a sound is generated based on audio information, and set a capturing area 910 as a range to be recorded in a captured image 901 displayed on the image capturing screen 310 based on at least one of the direction or the distance in which a sound is generated. For example, the electronic device 101 may identify a direction in which a sound is generated in the captured image 901, based on directivity information included in audio information obtained from the microphone 205 of the electronic device. For example, the electronic device 101 may identify a distance from a subject in the capturing area 910, based on an angle of view of a camera (e.g., the rear camera 203 of FIG. 2) which captures an image. Before adjusting the angle of view of the camera, the electronic device 101 may display information on an angle of view to be changed (not shown) on the image capturing screen 310. The electronic device 101 may automatically adjust an angle of view and a zoom magnification of the camera with reference to the configured recording range 910, and display an image 903 captured according to the adjusted angle of view and zoom magnification on the image capturing screen 310, as shown in FIG. 9.

Figure 10:
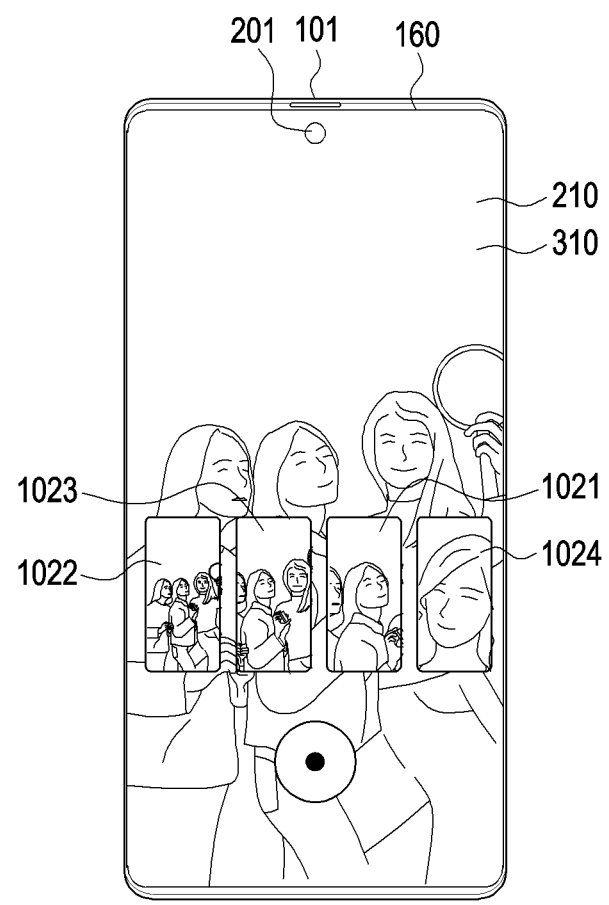
FIG. 10 illustrates an example of a screen of an operation method in an electronic device according to an embodiment.

FIG. 10 illustrates an example of a screen of an operation method in an electronic device according to an embodiment.

Referring to FIG. 10, at the time of performing operation 505 of FIG. 5, when a sound is identified in a direction in which the first surface 210 (e.g., the front surface or the first surface 210 of FIG. 2) of the housing of the electronic device 101 faces, based on audio information, the electronic device 101 (e.g., the electronic device 101 of FIGS. 1 and 2) according to an embodiment may obtain a first preview image 1021 captured by the first camera 201 (e.g., the front camera 201 of FIG. 2) disposed on the first surface 210 among cameras included in a camera module (e.g., the camera module 180 of FIG. 1). When a sound is identified as originating from a direction in which a second surface (e.g., the rear surface or the second surface 220 of FIG. 2) of the housing faces, based on the audio information, the electronic device 101 may obtain at least one second preview image (at least one of 1022, 1023, or 1024) captured by adjusting an angle of view and a zoom magnification of a second camera (e.g., the rear camera 203 of FIG. 2) disposed on the second surface. For example, if there are a plurality of second preview images, the electronic device may obtain the plurality of second preview images 1022, 1023, and 1024 by adjusting the angle of view and the zoom magnification of the second camera respectively differently. For example, the electronic device 101 may arrange and display the first preview image 1021 and the second preview images 1022, 1023, and 1024 in an order of higher to lower respective sound levels associated with each image. For another example, the electronic device 101 may obtain a plurality of first preview images by adjusting an angle of view and a zoom magnification of the first camera 201 differently.

For example, when a capturing area is configured based on at least one of a direction, or a distance identified based on the audio information is identified as corresponding to the second surface (e.g., the rear surface), the processor 120 may display at least one preview image captured by adjusting angle of view and zoom magnification of the rear camera. For example, when identifying sounds generated by subjects in the entire capturing area, the processor 120 may control the rear camera to capture a preview image 1022 by adjusting the angle of view and the zoom magnification to be ultra-wide. For example, when identifying that sounds are generated by a first subject and a second subject among subjects, the processor 120 may control the rear camera to obtain a preview image 1023 by adjusting the angle of view and the zoom magnification (e.g., 25× higher magnification). For example, when identifying a sound is generated by the second subject among the subjects, the processor 120 may control the rear camera to obtain a preview image 1024 by adjusting the angle of view and the zoom magnification (e.g., 30× higher magnification). For example, when identifying that an external area and the direction identified based on the audio information correspond to the first surface 210 (e.g., the front surface), the processor 120 may activate the front camera 201 and control the front camera 201 to obtain a preview image 1021. The at least one preview image may be displayed in at least one image form of a split view, a thumbnail, or a picture-in-picture (PIP), and in the case of a plurality of preview images, depending on the loudness of a sound, the order of the images may be changed in real time, newly added, or partially deleted, and the images may be arranged and displayed in an order of higher to lower sound loudness.

Figure 11:
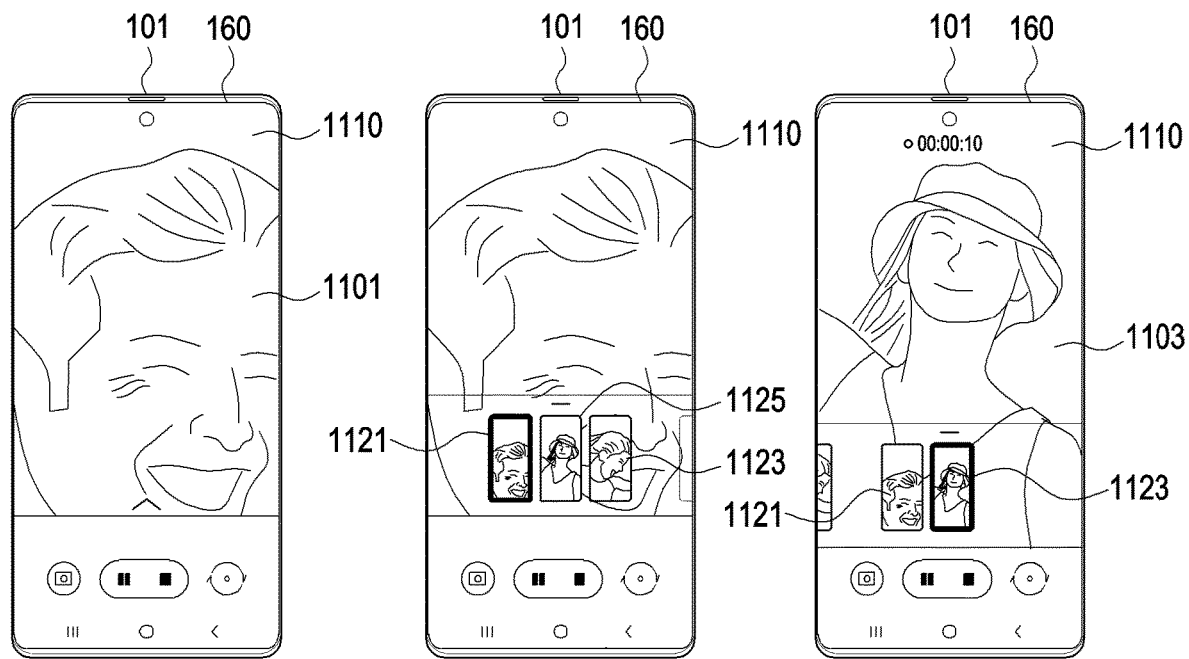
FIG. 11 illustrates an example of a screen of an operation method in an electronic device according to an embodiment.

FIG. 11 illustrates an example of a screen of an operation method in an electronic device according to an embodiment.

Referring to FIG. 11, the electronic device 101 (e.g., the electronic device 101 of FIGS. 1 and 2) according to an embodiment may record (or store in the memory 130) an image captured by a camera (e.g., the rear camera 203 of FIG. 2), and display an image recording screen 1110 displaying a recorded image 1101, as shown in FIG. 11. The electronic device 101 may configure a recording range (not shown), based on at least one of a direction or a distance in which a sound is generated, based on audio information obtained during image recording, and obtain a plurality of preview images 1121, 1123, and 1125 obtained according to different angles of view and zoom magnifications of the camera, based on the configured recording range. As shown in FIG. 11, the electronic device 101 may display, on the image recording screen 1110, the plurality of preview images 1121, 1123, and 1125 so as to be superimposed on or to be adjacent to the recorded image 1101. When one of the plurality of preview images 1121, 1123, and 1125 is selected, the electronic device 101 may adjust an angle of view and a zoom magnification of the camera to an angle of view and a zoom magnification corresponding to the selected preview image 1125, switch and record an image 1103 captured according to the adjusted angle of view and zoom magnification, as shown in FIG. 11, and continuously display the recorded image 1103 on the image recording screen 1110. For example, the electronic device 101 may display the plurality of preview images 1121, 1123, and 1125 as shown in FIG. 11 on an image capturing screen (e.g., the image capturing screen 310 of FIG. 10), and switch the image 1101 to the image 1103 captured according to the adjusted angle of view and zoom magnification and display the image on the image capturing screen, as shown in FIG. 11.

Figure 12:
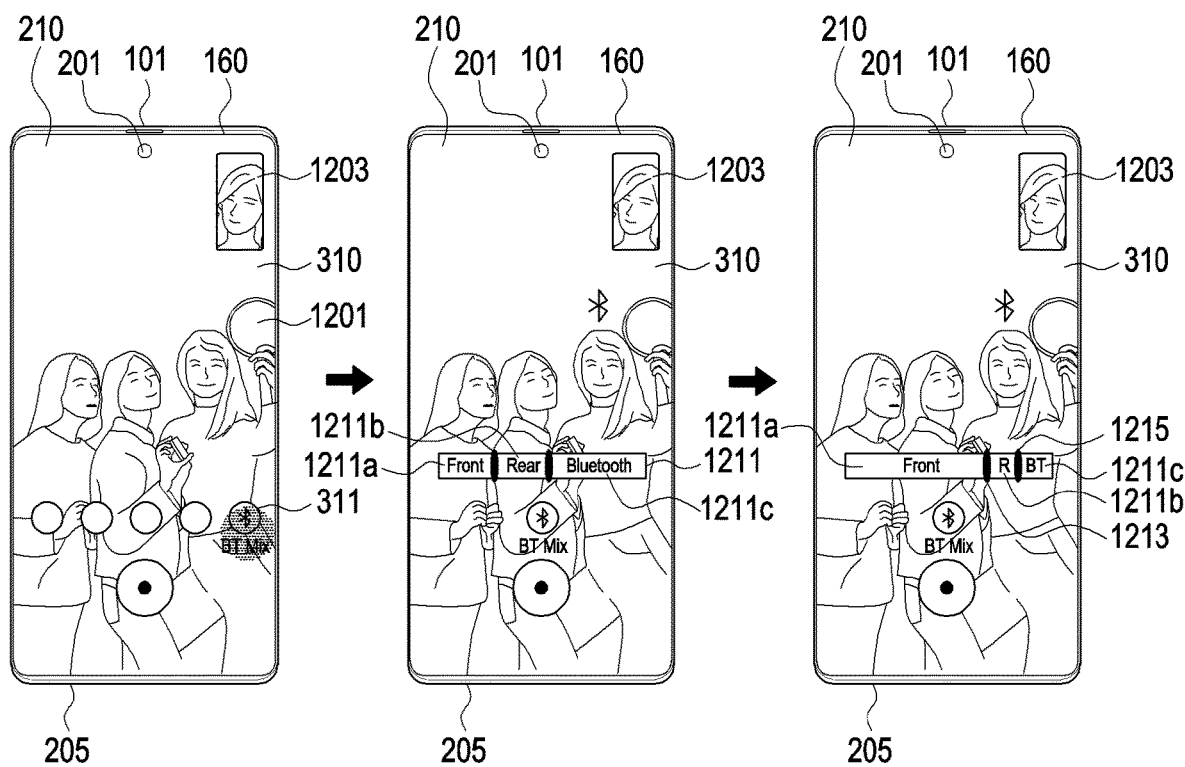
FIG. 12 illustrates an example of a screen of an operation method in an electronic device according to an embodiment.

FIG. 12 illustrates an example of a screen of an operation method in an electronic device according to an embodiment.

Referring to FIG. 12, when executing operation 503 of FIG. 5, as shown in FIG. 12, the electronic device 101 (e.g., the electronic device 101 of FIGS. 1 and 2) according to an embodiment may activate both the front camera 201 (e.g., the front camera 201 of FIG. 2) and a rear camera (e.g., the rear camera 203 of FIG. 2) included in a camera module (e.g., the camera module 180 of FIG. 1), display an image 1201 captured by the rear camera on the image capturing screen 310, and display an image 1203 captured by the front camera 201 on the image capturing screen 310. When the object 311 (e.g., the object 311 (BT mix) of FIG. 3) displayed on the image capturing screen 310 is selected, the electronic device 101 may activate both the microphone 205 (e.g., the microphone 205 of FIG. 2) of the electronic device 101 and at least one external microphone (e.g., the Bluetooth (BT) microphone 301 of FIG. 3) connected via wireless communication. As shown in FIG. 12, when the object 311 (e.g., the object 311 (BT mix) of FIG. 3) is selected, the electronic device 101 may display an object (or graphic element) 1211 for adjusting a sound level of each of the microphone 205 and the at least one external microphone on the image capturing screen 310. For example, as shown in FIG. 12, the object 1211 may be displayed in the form of a bar for adjusting a sound level (e.g., microphone sensitivity) by a user interface, and may be divided into a first portion 1211a indicating the activated microphone 205 of the electronic device, a second portion 1211b also indicating the activated microphone 205, but in a different directionality, and a third portion 1211c indicating the activated external microphone. The first portion 1211a may indicate a directional direction (e.g., front) in which a sound generated from a direction faces the first surface 210 (e.g., the front surface) is input to the microphone 205. The second portion 1211b may indicate a different directionality (e.g., rear) in which a sound generated from a second direction faces the second surface (e.g., the rear surface) is input to the microphone 205. As the relative sound balance between the activated microphone of the electronic device 101 and the activated external microphone is configured to be a specified percentage (e.g., 50%) for each of the activated microphones, the electronic device 101 may display a line 1213 for adjusting sound levels of the first portion 1211a and the second portion 1211b at a middle point on the object 1211 for adjustment of a sound level, and display a line 1215 for adjusting a sound level at a middle point of the third portion 1211c and the second portion 1211b and the first portion 1211a.

As shown in FIG. 12, at the time of performing operation 507 of FIG. 5, the electronic device 101 according to an embodiment may adjust directional directions of the microphone 205 and a sound level of each of the at least one external microphone according to the relative sound balance between the at least one external microphone and the directional directions of the microphone 205, based on audio information obtained during image capturing. For example, when the electronic device 101 identifies that a sound is generated from a front directionality of the microphone 205, based on the audio information obtained during image capturing, the electronic device may increase the sound level of the first portion 1211a. When the sound level of the first portion 1211a is increased, as shown in FIG. 12, the electronic device 101 may display that the line 1213 of the object 1211 is moved in a rightwards (e.g., a +x-axis) direction and adjusted to a ratio in which the sound balance of a front directional direction (front) of the microphone 205 corresponding to the first portion 1211a is greater than those of the second portion 1211b and the third portion 1211c (e.g., 70% ratio). For example, the electronic device may reduce a sound level in a rear directional direction (rear) of the microphone 205 corresponding to the second portion 1211b (e.g., 15% ratio), and reduce a sound level of the external microphone BT corresponding to the third portion 1211c (e.g., 15% ratio).

Figure 13:
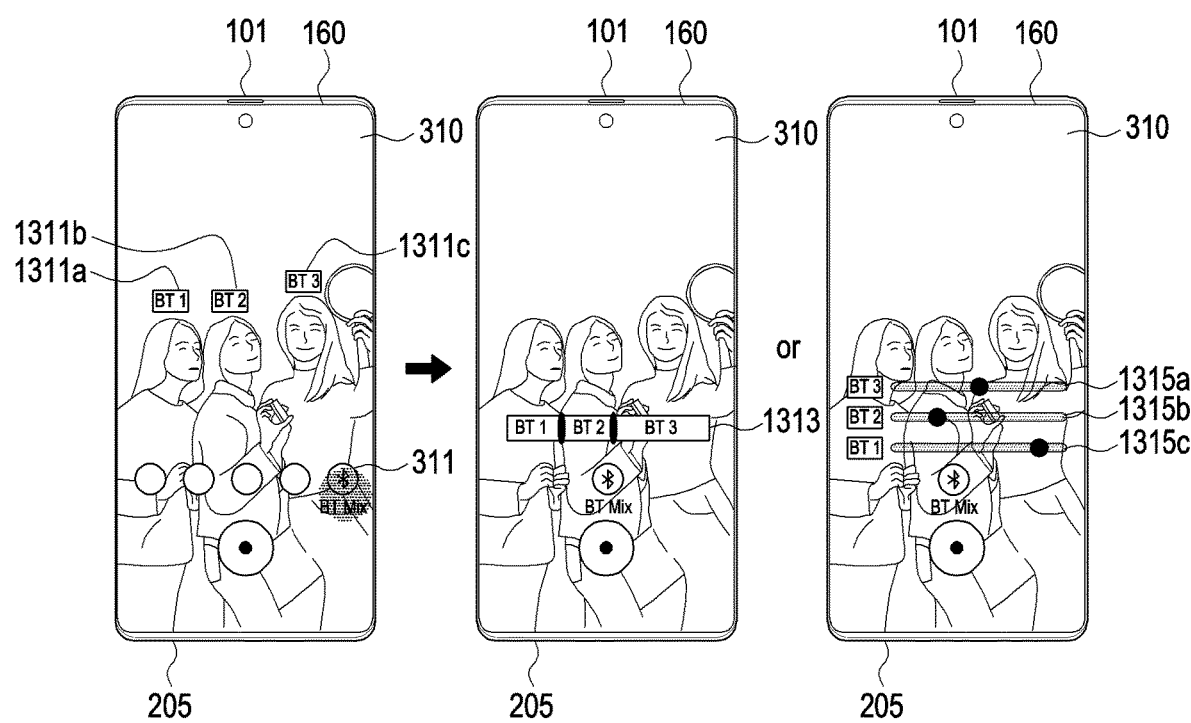
FIG. 13 illustrates an example of a screen of an operation method in an electronic device according to an embodiment.

FIG. 13 illustrates an example of a screen of an operation method in an electronic device according to an embodiment.

Referring to FIG. 13, at the time of performing operation 503 of FIG. 5, as shown in FIG. 13, the electronic device 101 (e.g., the electronic device 101 of FIGS. 1 and 2) according to an embodiment may display an image 1301 captured by a rear camera on the image capturing screen 310 displayed on the display module 160. The electronic device 101 may activate both the microphone 205 (e.g., the microphone 205 of FIG. 2) of the electronic device 101 and a plurality of external microphones BT1, BT2, and BT3 (e.g., the external microphone 301 of FIG. 3A) connected via wireless communication. The electronic device 101 may display objects 1311a, 1311b, and 1311c (e.g., graphic elements or symbols) representing the plurality of activated external microphones BT1, BT2, and BT3 on the image capturing screen 310. For example, at the time of performing operation 507 of FIG. 5, as shown in FIG. 13, when the object 311 (e.g., the object 311 (BT mix) of FIG. 3) is selected, the electronic device 101 may display, on the image capturing screen 310, one bar-shaped object (or graphic element) 1313 for adjusting sound levels of each of the plurality of external microphones BT1, BT2, and BT3 according to the sound balance between the plurality of external microphones BT1, BT2, and BT3. In another example, at the time of performing operation 507 of FIG. 5, as shown in FIG. 13, the electronic device 101 may display, on the image capturing screen 310, three separate bar-shaped objects (or graphic elements) 1315a, 1315b, and 1315c for the plurality of respective external microphones BT1, BT2, and BT3, the objects being for adjusting the sound level according to the sound balance between the plurality of external microphones BT1, BT2, and BT3. For example, the electronic device may adjust the sound level of each of the microphones BT1, BT2, and BT3 such that the relative sound balance between the external microphones is 70% for BT1, 10% for BT2, and 20% for BT3.

Figure 14:
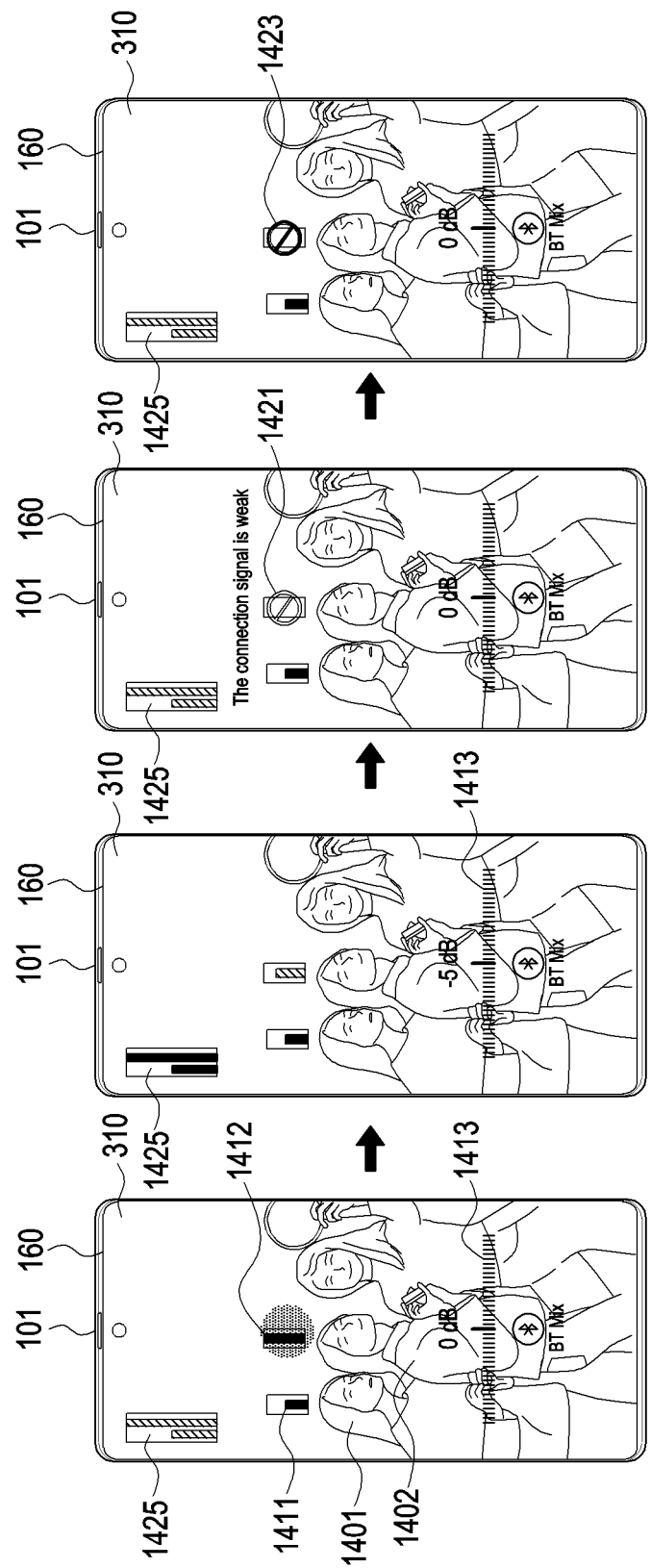
FIG. 14 illustrates an example of a screen of an operation method in an electronic device according to an embodiment.

FIG. 14 illustrates an example of a screen of an operation method in an electronic device according to an embodiment.

Referring to FIG. 14, at the time of performing operation 507 of FIG. 5, as shown in FIG. 14, the electronic device 101 (e.g., the electronic device 101 of FIGS. 1 and 2) according to an embodiment may display, on the image capturing screen 310, bar-shaped objects (or graphic elements) 1411 and 1412 for adjusting a sound level for each of a plurality of external microphones identified based on audio information so as disposed to be superimposed on or disposed to be adjacent to identified respective subjects 1401 and 1402. The electronic device 101 may display, on the image capturing screen 310, a gradation-shaped object 1413 for adjusting a sound level of any selected external microphone, and an object 1425 representing sounds (sound levels of L and R) heard when an image is reproduced after recording is finished by adding up audio information received from each of the plurality of connected external microphones. As shown in FIG. 14, when the object 1412 is selected, the electronic device 101 may adjust a sound level of the selected object 1412 to be low, and display the adjusted sound level value (e.g., −5 dB) via the object 1413. As shown in FIG. 14, the electronic device 101 may identify an external microphone that can be disconnected due to a weak connection signal among the plurality of identified external microphones during image capturing, and display, on the image capturing screen 310, an object (graphic element or symbol) 1421 indicating the weak connection signal, and guidance information in the form of text such as "The connection signal is weak.". As shown in FIG. 14, the electronic device 101 may identify an external microphone which is disconnected during image capturing, and display an object (graphic element or symbol) 1423 representing disconnection in an adjacent area to the object 1412 indicating the identified external microphone, and guidance information (not shown) on the image capturing screen 310.

Figure 15:
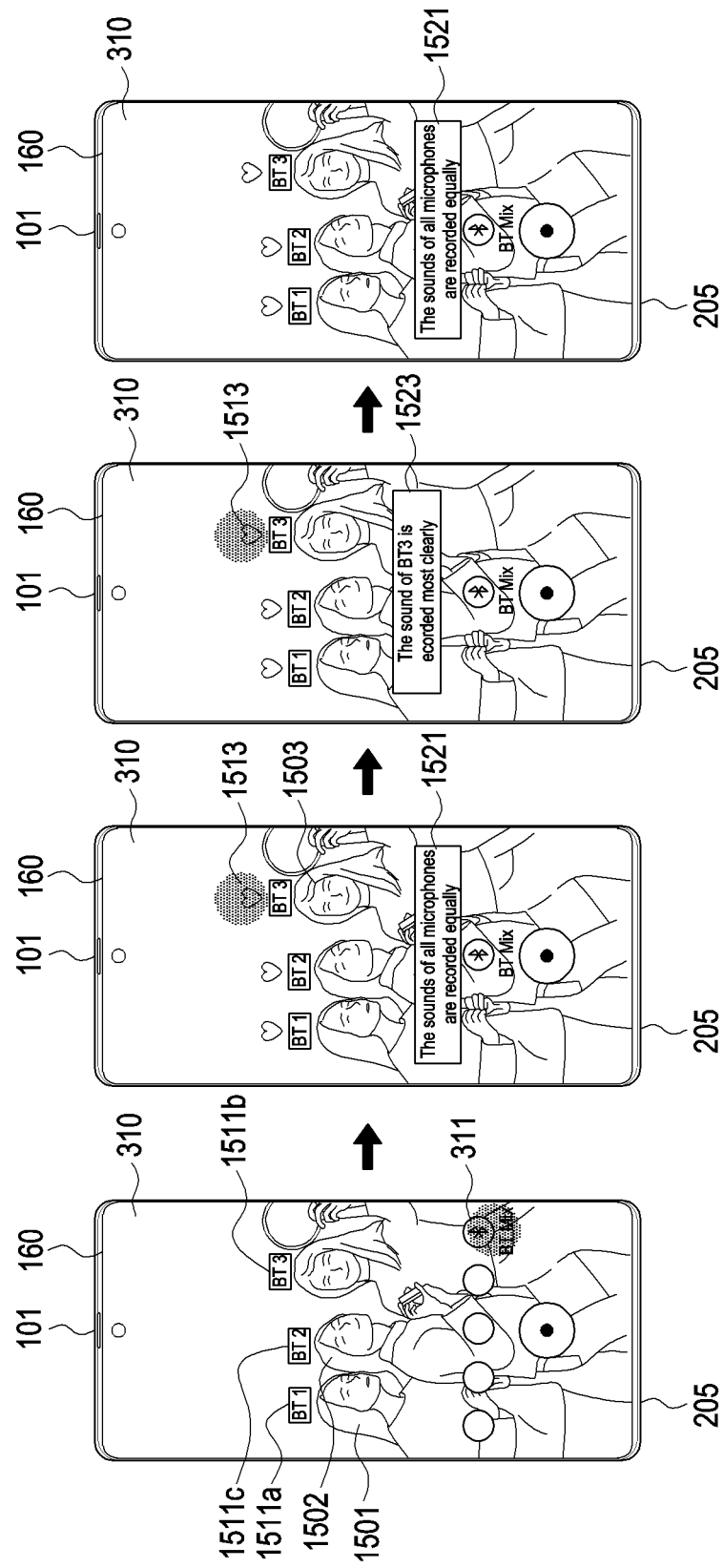
FIG. 15 illustrates an example of a screen of an operation method in an electronic device according to an embodiment.

FIG. 15 illustrates an example of a screen of an operation method in an electronic device according to an embodiment.

Referring to FIG. 15, at the time of performing operation 503 of FIG. 5, as shown in FIG. 15, the electronic device 101 (e.g., the electronic device 101 of FIGS. 1 and 2) according to an embodiment may display an image 1501 captured by a rear camera on the image capturing screen 310 displayed on the display module 160. The electronic device 101 may activate both the microphone 205 (e.g., the microphone 205 of FIG. 2) of the electronic device 101 and a plurality of external microphones (e.g., the external microphone 301 of FIG. 3A) connected via wireless communication. The electronic device 101 may display, on the image capturing screen 310, objects (e.g., graphic elements or symbols) 1511a, 1511b, and 1511c representing the plurality of activated external microphones BT1, BT2, and BT3, disposed adjacent to identified respective subjects.

According to an embodiment, at the time of performing operation 507 of FIG. 5, when the object 311 (e.g., the object 311 (BT mix) of FIG. 3) is selected, as shown in FIG. 15, the electronic device 101 may set the sound levels of each of the plurality of external microphones BT1, BT2, and BT3 to be relatively equal, and display guidance information 1521 indicating the same (e.g., "The sounds of all microphones are recorded equally."). As shown in FIG. 15, the electronic device 101 may identify a subject 1503 set to have high importance among the identified subjects 1501, 1502, and 1503, and when an object 1513 (e.g., BT 3 and/or a heart-shaped icon) corresponding to the identified subject (e.g., 1503) is selected, configure a sound level of an external microphone (BT 3) corresponding to the object 1513 to be high, and display guidance information 1523 (e.g., "The sound of BT3 is recorded most clearly."). The adjusted sound level of the external microphone BT 3 may be a sound level of the microphone of the electronic device 101 or a relatively high value compared to the other external microphones (e.g., BT1 and BT2). As shown in FIG. 15, when the selection of the object 1513 (e.g., BT 3) corresponding to the subject (e.g., 1503) is released, the electronic device 101 may set the sound levels of each of the plurality of external microphones to be relatively equally, and may display the guide information 1521 (e.g., "The sounds of all microphones are recorded equally.").

An electronic device (the electronic device 400 of FIG. 4B) according to another embodiment may further configure a camera to obtain preview images in three or more directions, and distinguishingly display the preview images in display areas divided by folding. As described in the operation method according to an embodiment such as FIGS. 5 to 15 described above, an electronic device according to another embodiment may adjust a sound level of each of a microphone of the electronic device and at least one external microphone, based on the sound balance between the microphone and the at least one external microphone, based on audio information, by using the same operation method.

According to an embodiment, an operation method in an electronic device (e.g., the electronic device 101 of FIGS. 1 and 2) may include, in response to receiving an image capturing request, controlling to activate a microphone of the electronic device and at least one external microphone connected via communication circuitry of the electronic device, displaying, via a display of the electronic device, an image captured by at least one camera included in a camera module of the electronic device, obtaining audio information related to a sound, wherein the sound is input to the microphone and the at least one external microphone during capturing of the image, adjusting a sound level of each of the microphone and the at least one external microphone according to a sound balance between the microphone and the at least one external microphone, based on the audio information, and displaying information related to the adjustment of the sound level via the display.

According to an embodiment, the method may further include identifying at least one of a direction or a distance in which the sound is generated, based on the audio information, setting an for image capture, based on at least one of the direction or the distance in which the sound is generated, adjusting at least one of an angle of view or a zoom magnification of the at least one camera based on the set area, and displaying an image captured by the at least one camera based on the adjusted angle of view and the adjusted zoom magnification on an image capturing screen displayed on the display module.

According to an embodiment, the method may further include identifying at least one of a direction or a distance in which the sound is generated, based on the audio information, setting an area for image capture, based on at least one of the direction or the distance in which the sound is generated, obtaining a plurality of preview images captured at different angles of view and zoom magnifications for the camera module in the set area, displaying the plurality of preview images on the display either superimposed upon or adjacent to the captured image, and when one of the plurality of preview images is selected, displaying the selected one of the plurality of preview images on the display.

According to an embodiment, the method may further include, when the sound is identified as originating from a direction in which a first surface of a housing of the electronic device faces, based on the audio information, obtaining a first preview image captured by a first camera disposed on the first surface, and when the sound is identified as originating from a direction in which a second surface of the housing faces, based on the audio information, obtaining a second preview image captured by a second camera disposed on the second surface.

According to an embodiment, the second preview image may be captured by adjusting an angle of view and a zoom magnification of the second camera, and wherein the first preview image and the second preview image may be displayed on an image capturing screen in an order of higher to lower sound level.

According to an embodiment, the method may further include identifying at least one subject related to the sound in the captured image, based on the audio information, identifying that the at least one external microphone corresponds the identified at least one subject, displaying an object representing the identified at least one external microphone on an image capturing screen in which the captured image is displayed, and displaying an object for adjusting sound levels of the microphone and the at least one external microphone on the image capturing screen on the image capturing screen.

According to an embodiment, the adjusting of the sound level of each of the microphone and the at least one external microphone may include, when the sound is identified from the direction in which the first surface of the housing of the electronic device faces, based on the audio information, adjusting a sound level of the microphone to be higher than a sound level of the at least one external microphone, and when the sound is identified from the direction in which the second surface of the housing of the electronic device faces, based on the audio information, adjusting the sound level of the at least one external microphone to be higher the sound level of the microphone.

According to an embodiment, in the method, further comprising displaying, on an image capturing screen displaying the captured image, an object for adjusting a sound level, the object indicating the at least one external microphone and directional directions of the microphone, and according to an embodiment, the adjusting of the sound level of each of the microphone and the at least one external microphone may include identifying a directional direction of the microphone in which the sound is generated, based on the audio information, and adjusting a sound level in the identified directional direction of the microphone to a high value by using the object.

According to an embodiment, the adjusting of the sound level of each of the microphone and the at least one external microphone may include, when a plurality of subjects are included in the captured image, identifying a subject set to have high importance among the plurality of subjects, and adjusting a sound level of an external microphone corresponding to the identified subject among the at least one external microphone to be higher than the sound level of the microphone.

According to an embodiment, provided is a non-transitory storage medium storing a program, in which a program may include an executable instructions which, when executed by a processor of an electronic device, causes the processor to, in response to receiving an image capturing request, control to activate a microphone of the electronic device and at least one external microphone connected via wireless communication circuitry of the electronic device, displaying, via a display of the electronic device, an image captured by at least one camera of the electronic device to be displayed on a display module of the electronic device, obtain audio information related to a sound, wherein the sound is input to the microphone and the at least one external microphone during capturing of the image, adjust a sound level of each of the microphone and the at least one external microphone according to a sound balance between the microphone and the at least one external microphone, based on the audio information, and display information related to the adjustment of the sound level via the display.

The embodiments disclosed herein are provided merely to describe technical contents and to help the understanding of the technical contents, and are not intended to limit the scope of the technology described herein. Therefore, it should be construed that the scope of the disclosure includes any change or other certain embodiments based on the technical idea of the disclosure.

An electronic device according to certain embodiments disclosed herein may be various types of devices. The electronic device may include, for example, a portable communication device (e.g., a smartphone), a computer device, a portable multimedia device, a portable medical device, a camera, a wearable device, or a home appliance device. The electronic device according to the embodiment herein is not limited to the above-described devices.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a camera module including at least one camera;
   a microphone;
   a display;
   communication circuitry;
   at least one processor electrically connected to the camera module, the microphone, the display, and the communication circuitry; and
   memory storing instructions that, when executed by at least one processor individually or collectively, cause the electronic device to:
   in response to receiving an image capturing request, control to activate the microphone and at least one external microphone connected via the communication circuitry,
   control the display to display an image captured by the at least one camera,
   obtain audio information related to a sound, wherein the sound is input to the microphone and the at least one external microphone during capturing of the image,
   adjust a sound level of each of the microphone and the at least one external microphone according to a sound balance between the microphone and the at least one external microphone, based on the audio information, and
   control the display module to display information related to the adjustment of the sound level.

2. The electronic device of claim 1, wherein the communication circuitry is configured to connect at least one external microphone using a Bluetooth communication.

3. The electronic device of claim 1, wherein the instructions cause the electronic device to:
   identify at least one of a direction or a distance in which the sound is generated, based on the audio information,
   set an area for image capture based on at least one of the direction or the distance in which the sound is generated,
   adjust at least one of adjust an angle of view or a zoom magnification of the at least one camera based on the set area, and
   control the display module to display an image captured by the at least one camera based on the adjusted angle of view and the adjusted zoom magnification on an image capturing screen.

4. The electronic device of claim 1, wherein the instructions cause the electronic device to:
   identify at least one of a direction or a distance in which the sound is generated, based on the audio information,
   set an area for image capture, based on at least one of the direction or the distance in which the sound is generated,
   obtain a plurality of preview images captured by at least one camera based on different angles of view and zoom magnifications for the camera module in the set area,
   control the display to display the plurality of preview images on the display either superimposed upon or adjacent to the captured image, and
   when one of the plurality of preview images is selected, control the display to display the selected one of the plurality of preview images.

5. The electronic device of claim 1, wherein the instructions cause the electronic device to:
   when the sound is identified as originating from a direction in which a first surface of a housing of the electronic device faces, based on the audio information, obtain a first preview image captured by a first camera disposed on the first surface, and
   when the sound is identified as originating from a direction in which a second surface of the housing faces, based on the audio information, obtain a second preview image captured by a second camera disposed on the second surface.

6. The electronic device of claim 5, wherein the second preview image is captured by adjusting an angle of view and a zoom magnification of the second camera, and
   wherein the first preview image and the second preview image are displayed on an image capturing screen in an order of higher to lower sound level.

7. The electronic device of claim 1, wherein the instructions cause the electronic device to:
   identify at least one subject related to the sound in the captured image, based on the audio information,
   identify that the at least one external microphone corresponds to the identified at least one subject,
   control the display to display an object representing the identified at least one external microphone on an image capturing screen in which the captured image is displayed, and
   control the display to display an object for adjusting sound levels of the microphone and the at least one external microphone on the image capturing screen.

8. The electronic device of claim 1, wherein the instructions cause the electronic device to:
   when the sound is identified from a direction in which a first surface of a housing of the electronic device faces, based on the audio information, adjust a sound level of the microphone to be greater than a sound level of the at least one external microphone, and
   when the sound is identified from a direction in which a second surface of the housing of the electronic device faces, based on the audio information, adjust the sound level of the at least one external microphone to be greater than the sound level of the microphone.

9. The electronic device of claim 1, wherein the instructions cause the electronic device to:
   control the display module to display, on an image capturing screen displaying the captured image, an object for adjusting a sound level, the object indicating the at least one external microphone and directional directions of the microphone, identify a first directional direction of the microphone in which the sound is generated, based on the audio information, and adjust a sound level in the identified first directional direction of the microphone to be greater than a sound level in a second directional direction of the microphone by using the object.

10. The electronic device of claim 1, wherein the instructions cause the electronic device to:

when a plurality of subjects is included in the image, identify a subject set to have high importance among the plurality of subjects, and adjust a sound level of an external microphone corresponding to the identified subject among the at least one external microphone to be greater than the sound level of the microphone.

11. An operation method in an electronic device, the method comprising:

in response to receiving an image capturing request, controlling to activate a microphone of the electronic device and at least one external microphone connected via communication circuitry of the electronic device;

displaying, via a display of the electronic device, an image captured by at least one camera of the electronic device;

obtaining audio information related to a sound, wherein the sound is input to the microphone and the at least one external microphone during capturing of the image;

adjusting a sound level of each of the microphone and the at least one external microphone according to a sound balance between the microphone and the at least one external microphone, based on the audio information; and displaying information related to the adjustment of the sound level via the display.

12. The method of claim 11, further comprising:

identifying at least one of a direction or a distance in which the sound is generated, based on the audio information, setting an area for image capture, based on at least one of the direction or the distance in which the sound is generated;

adjusting at least one of an angle of view or a zoom magnification of the at least one camera based on the set area; and displaying an image captured by the at least one camera based on at least one of the adjusted angle of view or the adjusted zoom magnification on an image capturing screen displayed on the display.

13. The method of claim 11, further comprising:

identifying at least one of a direction or a distance in which the sound is generated, based on the audio information, setting an area for image capture, based on at least one of the direction or the distance in which the sound is generated;

obtaining a plurality of preview images captured at different angles of view and zoom magnifications for an camera module in the set area;

displaying the plurality of preview images on the display either superimposed upon or adjacent to the captured image; and when one of the plurality of preview images is selected, displaying the selected one of the plurality of preview images on the display.

14. The method of claim 11, further comprising:

when the sound is identified as originating from a direction in which a first surface of a housing of the electronic device faces, based on the audio information, obtaining a first preview image captured by a first camera disposed on the first surface; and when the sound is identified as originating from a direction in which a second surface of the housing faces, based on the audio information, obtaining a second preview image captured by a second camera disposed on the second surface.

15. The method of claim 14, wherein the second preview image is captured by adjusting an angle of view and a zoom magnification of the second camera, and wherein the first preview image and the second preview image are displayed on an image capturing screen in an order of higher to lower sound level.

16. The method of claim 11, further comprising:

identifying at least one subject related to the sound in the captured image, based on the audio information;

identifying that the at least one external microphone corresponds the identified at least one subject;

displaying an object representing the identified at least one external microphone on image capturing screen in which the captured image is displayed; and displaying an object for adjusting sound levels of the microphone and the at least one external microphone on the image capturing screen.

17. The method of claim 11, wherein the adjusting of the sound level of each of the microphone and the at least one external microphone comprises:

when the sound is identified from a direction in which a first surface of a housing of the electronic device faces, based on the audio information, adjusting a sound level of the microphone to be greater than a sound level of the at least one external microphone; and when the sound is identified from a direction in which a second surface of the housing of the electronic device faces, based on the audio information, adjusting the sound level of the at least one external microphone to be greater than the sound level of the microphone.

18. The method of claim 11, further comprising:

displaying, on an image capturing screen displaying the captured image, an object for adjusting a sound level, the object indicating the at least one external microphone and directional directions of the microphone, and wherein the adjusting of the sound level of each of the microphone and the at least one external microphone comprises:

identifying a first directional direction of the microphone in which the sound is generated, based on the audio information; and adjusting a sound level in the identified first directional direction of the microphone to be greater than a sound level in a second directional direction of the microphone by using the object.

19. The method of claim 11, wherein the adjusting of the sound level of each of the microphone and the at least one external microphone comprises:

when a plurality of subjects are included in the captured image, identifying a subject set to have high importance among the plurality of subjects; and adjusting a sound level of an external microphone corresponding to the identified subject among the at least one external microphone to be greater than the sound level of the microphone.

20. A non-transitory storage medium storing one or more programs, wherein the one or more programs comprise an executable instructions which, when executed by at least one processor of an electronic device, causes the electronic device to:
- in response to receiving an image capturing request, control to activate a microphone of the electronic device and at least one external microphone connected via wireless communication circuitry of the electronic device;
- displaying, via a display of the electronic device, an image captured by at least one camera of the electronic device;
- obtain audio information related to a sound, wherein the sound is input to the microphone and the at least one external microphone during capturing of the image;
- adjust a sound level of each of the microphone and the at least one external microphone according to a sound balance between the microphone and the at least one external microphone, based on the audio information; and
- display information related to the adjustment of the sound level via the display.

* * * * *